(12) United States Patent
Yamamoto

(10) Patent No.: US 10,520,897 B2
(45) Date of Patent: Dec. 31, 2019

(54) ANALOG TIMEPIECE AND CONTROL METHOD OF ANALOG TIMEPIECE

(71) Applicant: Seiko Instruments Inc., Chiba-shi, Chiba (JP)

(72) Inventor: Kosuke Yamamoto, Chiba (JP)

(73) Assignee: SEIKO INSTRUMENTS INC., Chiba (JP)

(*) Notice: Subject to any disclaimer, the term of this patent is extended or adjusted under 35 U.S.C. 154(b) by 405 days.

(21) Appl. No.: 15/412,646

(22) Filed: Jan. 23, 2017

(65) Prior Publication Data

US 2017/0212477 A1    Jul. 27, 2017

(30) Foreign Application Priority Data

Jan. 25, 2016  (JP) .................................. 2016-011828
Sep. 26, 2016  (JP) .................................. 2016-186456

(51) Int. Cl.
*G04C 3/14* (2006.01)
*H02P 23/16* (2016.01)
*H02K 1/12* (2006.01)
*H02K 1/27* (2006.01)
*H02K 3/28* (2006.01)
*H02K 7/14* (2006.01)
*H02P 8/02* (2006.01)

(52) U.S. Cl.
CPC .............. *G04C 3/143* (2013.01); *H02K 1/12* (2013.01); *H02K 1/2706* (2013.01); *H02K 3/28* (2013.01); *H02K 7/14* (2013.01); *H02P 8/02* (2013.01); *H02P 23/16* (2016.02)

(58) Field of Classification Search
CPC . G04C 3/143; H02K 1/12; H02K 7/14; H02P 8/02
See application file for complete search history.

(56) References Cited

U.S. PATENT DOCUMENTS 4,912,692 A  *  3/1990  Kamens ................... G04C 3/14
                                                          318/696
2011/0013494 A1*  1/2011  Sato ....................... G04C 3/143
                                                          368/200

FOREIGN PATENT DOCUMENTS

JP          2006-101618 A      4/2016

* cited by examiner

*Primary Examiner* — Muhammad S Islam
(74) *Attorney, Agent, or Firm* — Brinks Gilson & Lione

(57) ABSTRACT

There is provided an analog timepiece including an hour hand, a minute hand, and a second hand which are rotated by a unit step operation of a stepping motor. The analog timepiece includes a rotor that rotates the hour hand, the minute hand, and the second hand, and that has a magnetic polarity, a stator that includes magnetic pole portions disposed around the rotor, coils that excite the magnetic pole portions, and a control unit that controls each unit step of the rotor in accordance with each pulse group by applying a pulse group including a rotary pulse for rotating the rotor and a braking pulse for braking rotation of the rotor, which is applied before the rotary pulse is applied, to the coil.

7 Claims, 13 Drawing Sheets

ANALOG TIMEPIECE AND CONTROL METHOD OF ANALOG TIMEPIECE

RELATED APPLICATIONS

This application claims priority under 35 U.S.C. § 119 to Japanese Patent Applications No. 2016-011828 filed on Jan. 25, 2016 and No. 2016-186456 filed on Sep. 26, 2016, the entire content of which is hereby incorporated by reference.

BACKGROUND OF THE INVENTION

Field of the Invention

The present invention relates to an analog timepiece and a control method of an analog timepiece.

Background Art

In the related art, an analog timepiece employs a stepping motor for operating an indicating hand such as an hour hand, a minute hand, and a second hand. The analog timepiece needs to reversely rotate the indicating hand in a fast-forward mode. In a case where the stepping motor can be reversely rotated in the fast-forward mode, it is necessary to decrease a holding torque of a rotor. However, in a case where the stepping motor is configured to have one coil, if the holding torque decreases, the stepping motor is likely to be out of step.

For example, as disclosed in Japanese Patent No. 4619081, the stepping motor which can be reversely rotated in the fast-forward mode includes a stepping motor including a stator having three magnetic pole portions and two coils (hereinafter, referred to as a "dual-coil motor"). In general, compared to the above-described stepping motor having one coil, the dual-coil motor is less likely to be out of step even if the holding torque decreases.

The dual-coil motor disclosed in Japanese Patent No. 4619081 has driving means for outputting a pulse for driving a rotor and thereafter outputting a pulse having a braking effect to prevent the rotor from being rotated one or more steps. This improves rotation reliability of the rotor.

Incidentally, according to the analog timepiece, in some cases, it is determined whether or not the rotor is rotated one unit step, based on an inductive voltage generated in the coil of the stator due to free vibration of the rotor, after the pulse for driving the rotor is output. In a case where it is determined that the rotor is not rotated one unit step, the pulse for driving the rotor is output again, thereby reliably rotating the rotor one unit step.

SUMMARY OF THE INVENTION

However, the dual-coil motor disclosed in Japanese Patent No. 4619081 outputs the pulse having the braking effect after outputting the pulse for driving the rotor. Consequently, free vibration cannot be generated in the rotor, and the inductive voltage cannot be generated in the coil. Accordingly, it is difficult to determine whether or not the rotor is rotated one unit step. Therefore, the analog timepiece in the related art has a possibility that the rotor of the stepping motor cannot secure the free vibration for each unit step. It is difficult to reliably detect the inductive voltage of the coil, thereby leading to a possibility that each unit step of the rotor cannot be reliably controlled.

Therefore, the present invention aims to provide an analog timepiece which can reliably control unit step rotation of a rotor, and a control method of an analog timepiece.

According to an aspect of the present invention, there is provided an analog timepiece which includes an indicating hand rotated by a unit step operation of a stepping motor. The analog timepiece includes a rotor that rotates the indicating hand, and that has a magnetic polarity, a stator that includes a magnetic pole portion disposed around the rotor, a coil that excites the magnetic pole portion, and a control unit that controls each unit step of the rotor in accordance with each pulse group by applying a pulse group including a rotary pulse for rotating the rotor and a braking pulse for braking rotation of the rotor, which is applied before the rotary pulse is applied, to the coil.

According to the aspect of the present invention, the control unit applies the pulse group including the rotary pulse for rotating the rotor and the braking pulse for braking rotation of the rotor, which is applied before the rotary pulse is applied, to the coil. In this manner, the control unit controls each unit step of the rotor in accordance with each pulse group. Accordingly, not only the rotor can be stopped at a regulated position by the braking pulse, but also the rotor can be rotated by the rotary pulse. After the rotary pulse is applied to the coil, it is possible to stop exciting the magnetic pole portion. In this manner, free vibration can be secured for each unit step of the rotor so as to reliably generate an inductive voltage in the coil. Therefore, it is possible to reliably control unit step rotation of the rotor.

In the above-described analog timepiece, it is preferable that the control unit detects a rotation state of the rotor by detecting an inductive voltage generated in the coil due to free vibration generated in the rotor after the pulse group is applied to the coil.

According to the aspect of the present invention, since the rotation state of the rotor is detected, it is possible to determine whether or not the rotor is rotated one unit step. In this manner, in a case where the rotor is not rotated one unit step, a pulse for rotating the rotor is applied again. Therefore, it is possible to reliably rotate the rotor each unit step.

In the above-described analog timepiece, it is preferable that the magnetic pole portion includes a first magnetic pole portion, a second magnetic pole portion, and a third magnetic pole portion, and that the coil includes a first coil that is magnetically coupled to the first magnetic pole portion and the third magnetic pole portion, and a second coil that is magnetically coupled to the second magnetic pole portion and the third magnetic pole portion.

According to the aspect of the present invention, it is possible to provide the stepping motor which can reliably rotate the rotor one unit step and which includes the stator having three magnetic pole portions and two coils.

In the above-described analog timepiece, it is preferable that the rotor is located at a predetermined stop position in a state where the magnetic pole portion is not excited, that the first magnetic pole portion and the second magnetic pole portion are disposed to face one magnetic pole of the rotor located at the stop position, that the third magnetic pole portion is disposed to face the other magnetic pole of the rotor located at the stop position, that the braking pulse excites the magnetic pole portion so that the first magnetic pole portion and the second magnetic pole portion have a pole which is different from the one magnetic pole of the rotor, and so that the third magnetic pole portion has a pole which is different from the other magnetic pole of the rotor, and that the rotary pulse excites the magnetic pole portion so that any one of the first magnetic pole portion and the second magnetic pole portion has a pole which is the same as the one magnetic pole of the rotor.

According to the aspect of the present invention, the braking pulse excites the magnetic pole portion so that the first magnetic pole portion and the second magnetic pole portion have a pole which is different from one magnetic pole of the rotor, and so that the third magnetic pole portion has a pole which is different from the other magnetic pole of the rotor. Accordingly, the rotor can be attracted to and reliably stopped at the predetermined stop position. In addition, the rotary pulse excites the magnetic pole portion so that any one of the first magnetic pole portion and the second magnetic pole portion has a pole which is the same as one magnetic pole of the rotor. Accordingly, the rotor can be rotated from the stop position so that one magnetic pole of the rotor is separated from any one of the first magnetic pole portion and the second magnetic pole portion. Therefore, it is possible to configure the pulse group for rotating the above-described rotor one unit step.

In the above-described analog timepiece, it is preferable that a period during which each unit step of the rotor is controlled by the control unit is set to a unit frame, and that the control unit applies a correction drive pulse group including a correction-purpose rotary pulse for rotating the rotor and a correction-purpose braking pulse for braking the rotation of the rotor, which is applied before the correction-purpose rotary pulse is applied, to the coil for each unit frame in accordance with a detection result of the inductive voltage.

According to the aspect of the present invention, in accordance with the detection result of the inductive voltage by which it is possible to determine whether or not the rotor is rotated one unit step, the control unit applies the correction drive pulse group for rotating the rotor to the coil for each unit frame. Therefore, it is possible to reliably rotate the rotor each unit step.

In the above-described analog timepiece, it is preferable that a period during which each unit step of the rotor is controlled by the control unit is set to a unit frame, and that in a case where the indicating hand is operated in a fast-forward mode, the control unit applies the pulse group to the coil in the first unit frame in the fast-forward hand operation, and applies only the rotary pulse to the coil in the second and subsequent unit frames.

According to the aspect of the present invention, compared to a configuration in which the pulse group including the rotary pulse and the braking pulse is applied to the coil in all unit frames during a fast-forward hand operation, a pulse application time is shortened in each unit frame in the second and subsequent unit frames during the fast-forward hand operation. Therefore, a time in each unit frame in the second and subsequent unit frames can be shortened, thereby contributing to a preferable fast-forward hand operation.

According to another aspect of the present invention, there is provided a control method of an analog timepiece in which an indicating hand is rotated by a unit step operation of a stepping motor including a rotor that rotates the indicating hand, and that has a magnetic polarity, a stator that includes a magnetic pole portion disposed around the rotor, and a coil that excites the magnetic pole portion. The control method includes a drive step of controlling each unit step of the rotor in accordance with each pulse group by applying a pulse group including a rotary pulse for rotating the rotor and a braking pulse for braking rotation of the rotor, to the coil. The drive step includes a braking pulse application step of applying the braking pulse to the coil and a rotary pulse application step of applying the rotary pulse to the coil after the braking pulse application step.

According to the aspect of the present invention, after the braking pulse application step of applying the braking pulse to the coil, the rotary pulse is applied to the coil in the rotary pulse application step. Accordingly, after the rotary pulse is applied to the coil, it is possible to stop exciting the magnetic pole portion. In this manner, free vibration can be secured for each unit step of the rotor so as to reliably generate the inductive voltage in the coil. Therefore, it is possible to reliably control unit step rotation of the rotor.

According to the analog timepiece in the aspect of the present invention, the control unit applies the pulse group including the rotary pulse for rotating the rotor and the braking pulse for braking rotation of the rotor, which is applied before the rotary pulse is applied, to the coil. In this manner, the control unit controls each unit step of the rotor in accordance with each pulse group. Accordingly, not only the rotor can be stopped at a regulated position by the braking pulse, but also the rotor can be rotated by the rotary pulse. After the rotary pulse is applied to the coil, it is possible to stop exciting the magnetic pole portion. In this manner, free vibration can be secured for each unit step of the rotor so as to reliably generate an inductive voltage in the coil. Therefore, it is possible to reliably control unit step rotation of the rotor.

According to the control method of the analog timepiece in the aspect of the present invention, after the braking pulse application step of applying the braking pulse to the coil, the rotary pulse is applied to the coil in the rotary pulse application step. Accordingly, after the rotary pulse is applied to the coil, it is possible to stop exciting the magnetic pole portion. In this manner, free vibration can be secured for each unit step of the rotor so as to reliably generate the inductive voltage in the coil. Therefore, it is possible to reliably control unit step rotation of the rotor.

DETAILED DESCRIPTION OF THE INVENTION

Hereinafter, an embodiment according to the present invention will be described with reference to the drawings.

Embodiment

Figure 1:
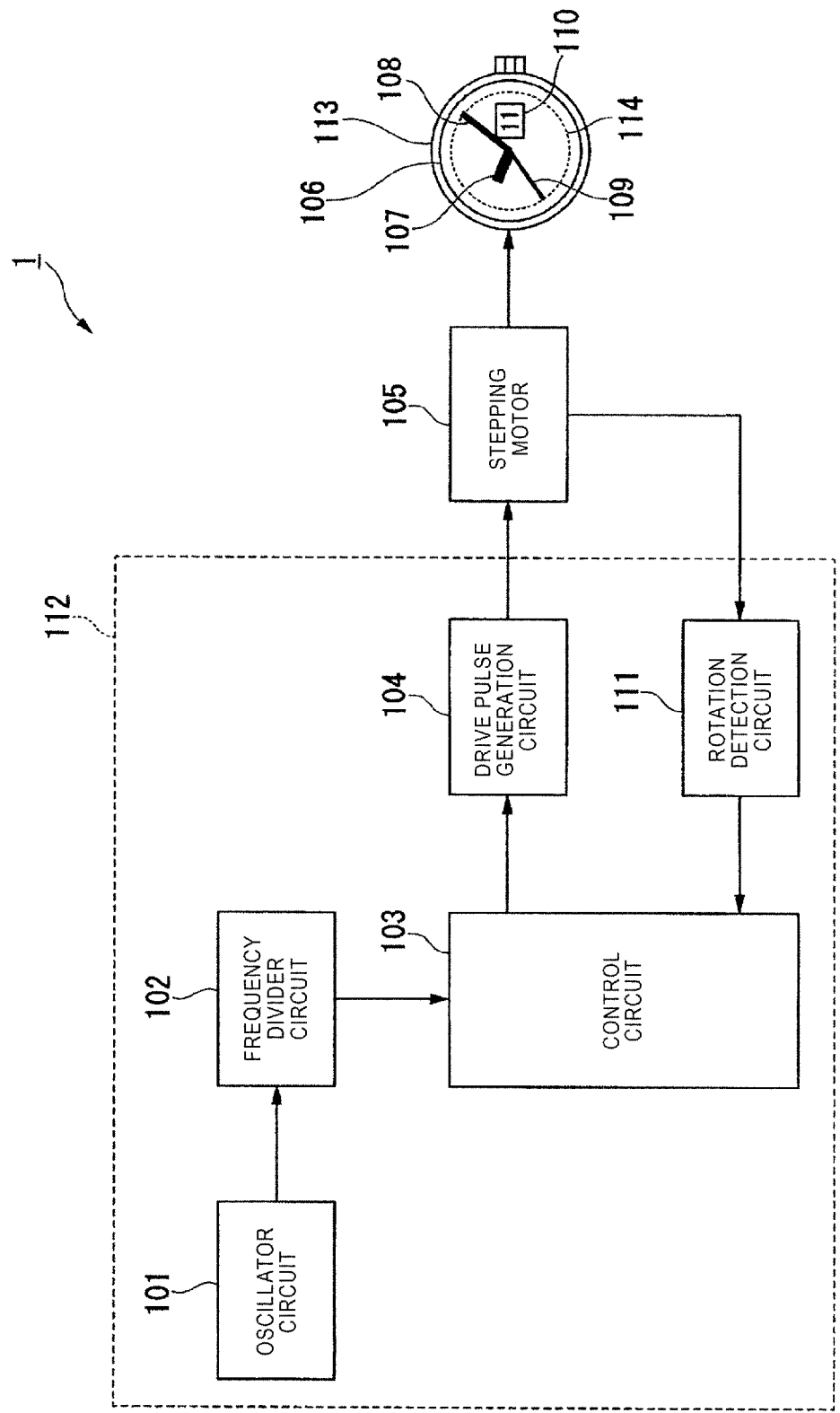
FIG. 1 is a block diagram illustrating an analog timepiece according to an embodiment.

FIG. 1 is a block diagram illustrating an analog timepiece according to an embodiment.

As illustrated in FIG. 1, an analog timepiece 1 includes an oscillator circuit 101, a frequency divider circuit 102, a control circuit 103, a drive pulse generation circuit 104, a stepping motor 105, a rotation detection circuit 111, a train wheel (not illustrated), and an analog display unit 106.

The oscillator circuit 101 generates a signal having a predetermined frequency.

The frequency divider circuit 102 divides the signal generated by the oscillator circuit 101, and generates a timepiece signal serving as a time measurement reference.

The control circuit 103 controls each electronic circuit element configuring the analog timepiece 1, and controls a pulse signal for motor rotation and drive.

Based on a control signal from the control circuit 103, the drive pulse generation circuit 104 outputs the pulse signal for motor rotation and drive.

The stepping motor 105 is rotatably driven by the pulse signal for motor rotation and drive which is output from the drive pulse generation circuit 104.

The rotation detection circuit 111 detects a detection signal generated by the stepping motor 105.

The oscillator circuit 101, the frequency divider circuit 102, the control circuit 103, the drive pulse generation circuit 104, and the rotation detection circuit 111 configure a control unit 112 of the analog timepiece 1.

The train wheel (not illustrated) is rotatably driven by the stepping motor 105.

The analog display unit 106 has indicating hands (an hour hand 107, a minute hand 108, and a second hand 109) which are rotatably driven by the train wheel, and a calendar display unit 110 for date display.

In addition, the analog timepiece 1 includes a timepiece case 113. An analog display unit 106 is disposed on an outer surface side of the timepiece case 113. In addition, a timepiece movement 114 including the above-described train wheel is disposed inside the timepiece case 113.

Figure 2:
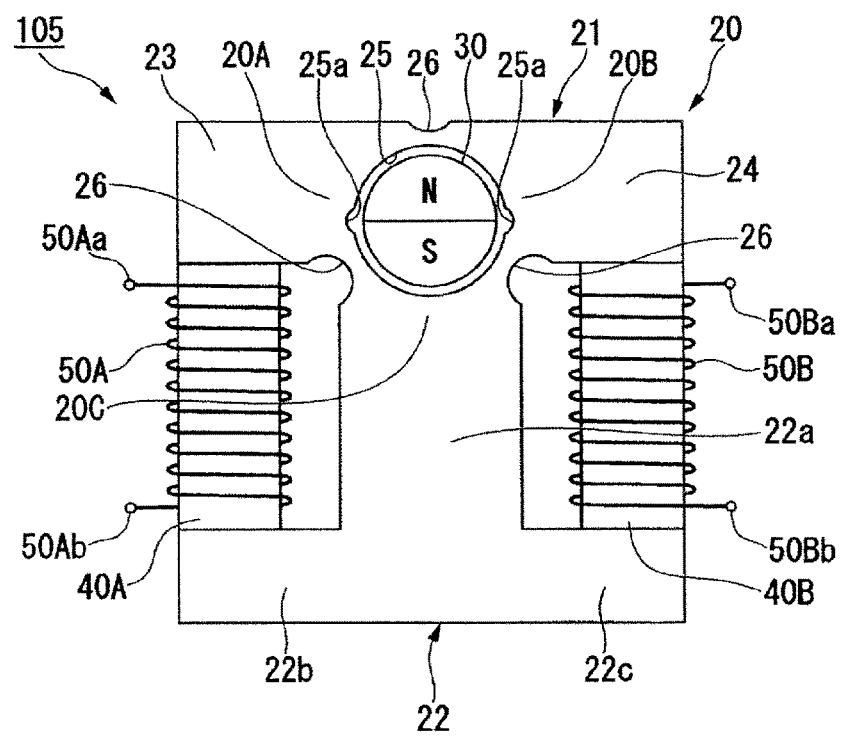
FIG. 2 is a schematic view of a stepping motor according to the embodiment.

FIG. 2 is a schematic view of the stepping motor 105 according to the embodiment.

As illustrated in FIG. 2, the stepping motor 105 includes a stator 20 which has a rotor accommodation hole 25, and a rotor 30 which has a magnetic polarity by being magnetized in two poles in the radial direction and which is rotatably disposed in the rotor accommodation hole 25. The stepping motor 105 is operated each unit step, and rotates the hour hand 107, the minute hand 108, and the second hand 109.

The stator 20 includes a stator main body 21, a first magnetic core 40A and a second magnetic core 40B which are magnetically joined to the stator main body 21, and a first coil 50A and a second coil 50B which are wound around the respective magnetic cores 40A and 40B.

For example, the stator main body 21 is formed from a plate member using a highly magnetically permeable material such as a permalloy. The stator main body 21 has a T-shaped first yoke 22 including a linear portion 22a extending in a predetermined first direction and a pair of protruding portions 22b and 22c protruding to both sides in a second direction orthogonal to the first direction from one end portion of the linear portion 22a, and a pair of second yokes 23 and 24 protruding to both sides in the second direction from the other end portion of the linear portion 22a. The stator main body 21 is formed in an H-shape in a plan view. The first yoke 22 and the second yokes 23 and 24 are integrally formed. The second yoke 23 protrudes to the same side as the protruding portion 22b in the second direction from the linear portion 22a. The second yoke 24 protrudes to the same side as the protruding portion 22c in the second direction from the linear portion 22a.

The above-described rotor accommodation hole 25 having a circular hole shape is formed in an intersection between the first yoke 22 and the second yokes 23 and 24 of the stator main body 21. A pair of cutout portions 25a are formed side by side in the second direction on an inner peripheral surface of the rotor accommodation hole 25 so as to face each other. The cutout portions 25a are cut out in an arc shape. The cutout portions 25a are configured to serve as positioning portions for determine the stop position of the rotor 30. When the magnetic pole axis of the rotor 30 is located at a position orthogonal to a line segment connecting the pair of cutout portions 25a, that is, when the magnetic pole axis is located at a position along the first direction, the potential energy of the rotor 30 is lowest, and the rotor 30 is stably stopped. Hereinafter, a stop position (position illustrated in FIG. 2) of the rotor 30 when the magnetic pole axis of the rotor 30 extends along the first direction and the S-pole of the rotor 30 is oriented to the first yoke 22 side is referred to as a first stop position. In addition, a stop position of the rotor 30 when the magnetic pole axis of the rotor 30 extends along the first direction and the N-pole of the rotor 30 is oriented to the first yoke 22 side is referred to as a second stop position.

In addition, three cutout portions 26 cut out toward the rotor accommodation hole 25 from the outer peripheral edge of the stator main body 21 in a plan view are formed around the rotor accommodation hole 25 in the stator main body 21. The respective cutout portions 26 are formed in a corner portion where the first yoke 22 and the second yoke 23 are connected to each other, a corner portion where the first yoke 22 and the second yoke 24 are connected to each other, and a portion where the second yoke 23 and the second yoke 24 are connected to each other. The respective cutout portions 26 are cut out in an arc shape.

A portion around the rotor accommodation hole 25 in the stator main body 21 is locally narrowed by the respective cutout portions 26. In this manner, in the stator main body 21, the narrowed portion is likely to be magnetically saturated. The magnetic saturation occurs, thereby magnetically dividing the stator main body 21 into three pieces around the rotor accommodation hole 25. The stator main body 21 has a first magnetic pole portion 20A disposed at a position corresponding to the second yoke 23 around the rotor 30, a second magnetic pole portion 20B disposed at a position corresponding to the second yoke 24 around the rotor 30, and a third magnetic pole portion 20C disposed at a position corresponding to the linear portion 22a of the first yoke 22 around the rotor 30. The first magnetic pole portion 20A and the second magnetic pole portion 20B are disposed to face the N-pole of the rotor 30 located at the first stop position (S-pole of the rotor 30 located at the second stop position). The third magnetic pole portion 20C is disposed to face the S-pole of the rotor 30 located at the first stop position (N-pole of the rotor 30 located at the second stop position).

For example, the respective magnetic cores 40A and 40B are formed of a highly magnetically permeable material such as a permalloy. A magnetic core 40A is magnetically connected to a distal end portion of the protruding portion 22b and a distal end portion of the second yoke 23. A magnetic core 40B is magnetically connected to a distal end portion of the protruding portion 22c and a distal end portion of the second yoke 24. Both end portions of the respective magnetic cores 40A and 40B are linked to the stator main body 21 by means of screwing, for example.

The first coil 50A is wound around the first magnetic core 40A, and is magnetically coupled to the first magnetic pole portion 20A and the third magnetic pole portion 20C. The first coil 50A has a first terminal 50Aa and a second terminal 50Ab. The first coil 50A is wound so as to generate a magnetic field into the first coil 50A from the protruding portion 22b side toward the second yoke 23 side, when a current flows from the first terminal 50Aa toward the second terminal 50Ab.

The second coil 50B is wound around the second magnetic core 40B, and is magnetically coupled to the second magnetic pole portion 20B and the third magnetic pole portion 20C. The second coil 50B has a first terminal 50Ba and a second terminal 50Bb. The second terminal 50Bb of the second coil 50B is disposed so as to have the same potential as the second terminal 50Ab of the first coil 50A. The second coil 50B is wound so as to generate a magnetic field into the second coil 50B from the protruding portion 22c side toward the second yoke 24 side, when a current flows from the first terminal 50Ba toward the second terminal 50Bb.

The first coil 50A and the second coil 50B have the respectively the same conducting wire diameter and winding number of times. The terminal of the respective coils 50A and 50B is connected to the drive pulse generation circuit 104. In the following description, a potential of the first terminal 50Aa of the first coil 50A is set to out1. A potential of the first terminal 50Ba of the second coil 50B is set to out2. A potential of the second terminal 50Bb of the second terminal 50Ab and the second coil 50B of the first coil 50A is set to out3.

If a magnetic flux is generated from the coils 50A and 50B in the stator 20 configured in this way, the magnetic flux flows along the respective magnetic cores 40A and 40B and the stator main body 21. Then, in accordance with a state of power supplied to the respective coils 50A and 50B, the above-described polarities of the first magnetic pole portion 20A, the second magnetic pole portion 20B, and the third magnetic pole portion 20C are switched.

Figure 3:
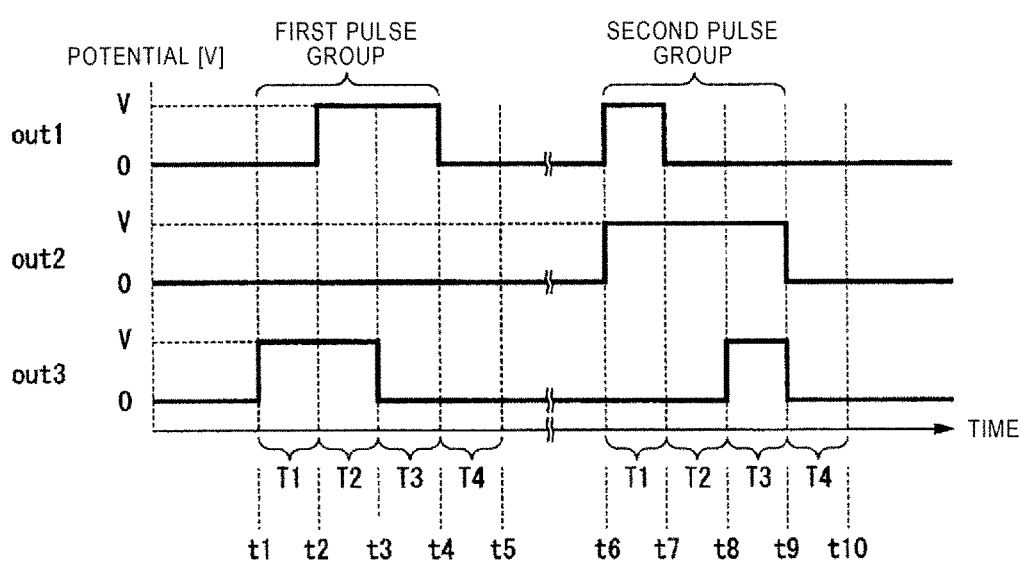
FIG. 3 is a time chart of a control process of the analog timepiece according to the embodiment.

FIG. 3 is a time chart of a control process of the analog timepiece according to the embodiment. FIGS. 4 to 13 are operation diagrams of the stepping motor according to the embodiment. In FIGS. 4 to 13, a two-dot chain line arrow illustrates a direction of the magnetic flux generated from the respective coils 50A and 50B.

Next, referring to FIG. 3, an operation of the stepping motor 105 according to the present embodiment will be described. In the following description, an operation of the stepping motor 105 when the second hand 109 of the analog timepiece 1 is driven at 1 Hz will be described. When the time chart illustrated in FIG. 3 starts, the respective magnetic pole portions 20A to 20C are not excited. FIG. 3 illustrates a state where the rotor 30 is located at the first stop position.

The control method of the analog timepiece 1 according to the present embodiment has a drive step of controlling each unit step (180°) of the rotor 30 in accordance with each pulse group by applying a predetermined pulse group to the respective coils 50A and 50B. The analog timepiece 1 operates the second hand 109 by repeatedly performing the drive step.

The predetermined pulse group described above excites the respective magnetic pole portions 20A to 20C facing the rotor 30 so as to have a polarity opposite to the polarity of the rotor 30, and includes a braking pulse for braking the rotation of the rotor 30 (first braking pulse and second braking pulse), and a rotary pulse for rotating the rotor 30 (first initial suction pulse, first initial repulsive pulse, second initial suction pulse, and second initial repulsive pulse).

The drive step includes a braking pulse application step of applying the above-described braking pulse to the respective coils 50A and 50B and a rotary pulse application step of applying the above-described rotary pulse to the respective coils 50A and 50B.

At first, the first pulse group (first braking pulse, first initial suction pulse, and first initial repulsive pulse) is applied to the respective coils 50A and 50B, and the rotor 30 is rotated one unit step from the first stop position toward the second stop position.

Timing t1

First, the control unit 112 performs the braking pulse application step. At timing t1, the drive pulse generation circuit 104 applies the first braking pulse having a pulse width T1 to the respective coils 50A and 50B. As the first braking pulse, the drive pulse generation circuit 104 applies a predetermined voltage V to the respective second terminals 50Ab and 50Bb of both coils 50A and 50B (out1=0, out2=0, out3=V). In this manner, a current flows from the second terminal 50Ab toward the first terminal 50Aa in the first coil 50A. In addition, a current flows from the second terminal 50Bb toward the first terminal 50Ba in the second coil 50B.

Figure 4:
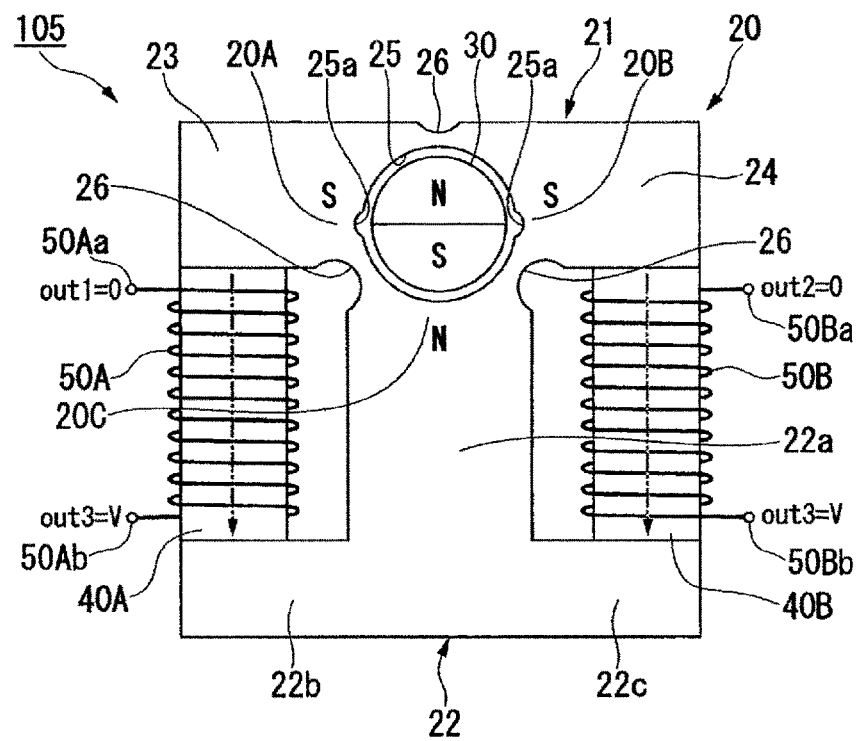
FIG. 4 is an operation diagram of the stepping motor according to the embodiment.

As illustrated in FIG. 4, the first braking pulse is applied to the respective coils 50A and 50B, thereby exciting the first magnetic pole portion 20A and the second magnetic pole portion 20B which are disposed to face the N-pole of the rotor 30 so as to have the S-pole. In addition, the third magnetic pole portion 20C disposed to face the S-pole of the rotor 30 is excited so as to have the N-pole. As a result, the rotor 30 is attracted to the first stop position.

Timing t2

Subsequently, the control unit 112 performs the rotary pulse application step. After the first braking pulse is applied, that is, at timing t2 after Time T1 has elapsed from timing t1, the drive pulse generation circuit 104 applies the first initial suction pulse having a pulse width T2 to the respective coils 50A and 50B. As the first initial suction pulse, the drive pulse generation circuit 104 applies the predetermined voltage V to the first terminal 50Aa of the first coil 50A, and applies the predetermined voltage V to the respective second terminals 50Ab and 50Bb (out1=V, out2=0, out3=V). In this manner, in the first coil 50A, both terminals 50Aa and 50Ab have the same potential, and the first coil 50A is brought into a non-energized state. In addition, a current flows from the second terminal 50Bb toward the first terminal 50Ba in the second coil 50B. The pulse width T2 may be longer than, shorter than, or equal to the pulse width T1.

Figure 5:
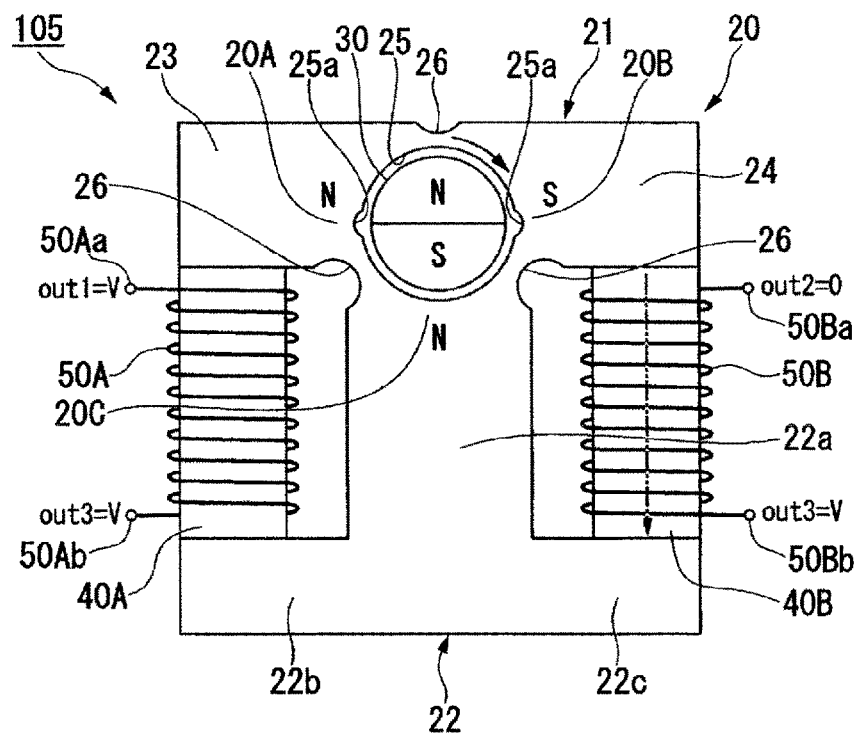
FIG. 5 is an operation diagram of the stepping motor according to the embodiment.

As illustrated in FIG. 5, the first initial suction pulse is applied to the respective coils 50A and 50B, thereby exciting the first magnetic pole portion 20A and the third magnetic pole portion 20C so as to have the N-pole. In addition, the second magnetic pole portion 20B is excited so as to have the S-pole. As a result, the rotor 30 is rotated, for example, as much as approximately 60° in a predetermined rotation direction so that the N-pole of the rotor 30 is sucked by the second magnetic pole portion 20B after being separated from the first magnetic pole portion 20A and so that the S-pole of the rotor 30 is sucked by the first magnetic pole portion 20A and the third magnetic pole portion 20C. Hereinafter, the rotation direction is referred to as a "predetermined rotation direction".

Timing t3

After the first initial suction pulse is applied, that is, at timing t3 after Time T2 has elapsed from timing t2, the drive pulse generation circuit 104 applies the first initial repulsive pulse having a pulse width T3 to the respective coils 50A and 50B. As the first initial repulsive pulse, the drive pulse generation circuit 104 applies the predetermined voltage V to the first terminal 50Aa of the first coil 50A (out1=V, out2=0, out3=0). In this manner, a current flows from the first terminal 50Aa toward the second terminal 50Ab in the first coil 50A. In addition, the second coil 50B is brought into a non-energized state. The pulse width T3 may be longer than, shorter than, or equal to the pulse width T1 or the pulse width T2.

Figure 6:
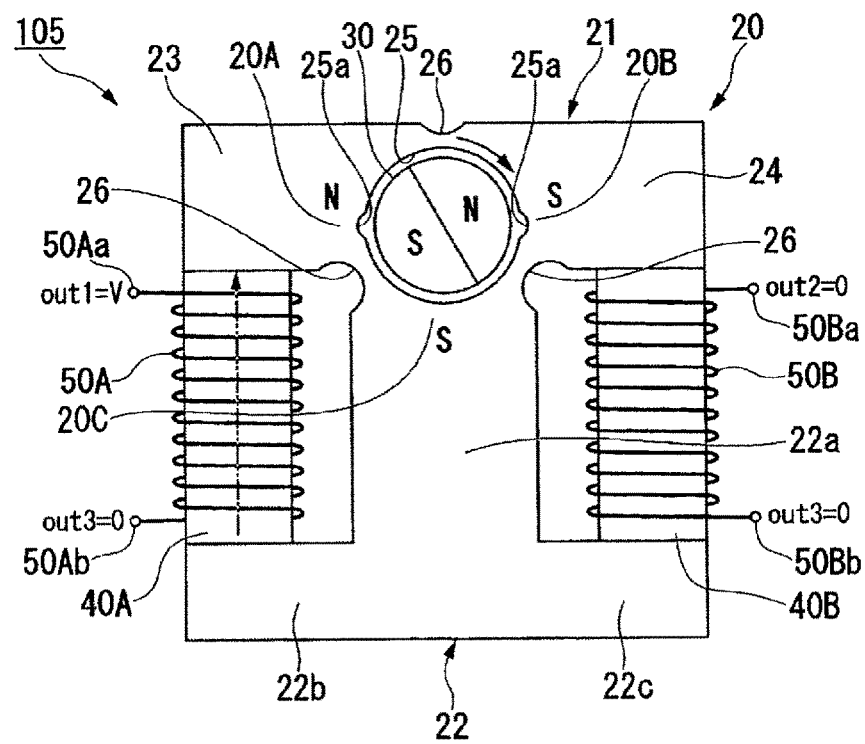
FIG. 6 is an operation diagram of the stepping motor according to the embodiment.

As illustrated in FIG. 6, the first initial repulsive pulse is applied to the respective coils 50A and 50B, thereby exciting the first magnetic pole portion 20A so as to have the N-pole. In addition, the second magnetic pole portion 20B and the third magnetic pole portion 20C are excited so as to have the S-pole. As a result, the rotor 30 is rotated, for example, as much as approximately 60° in a predetermined rotation direction so that the N-pole of the rotor 30 is sucked by the second magnetic pole portion 20B and so that the S-pole of the rotor 30 is sucked by the first magnetic pole portion 20A after being separated from the third magnetic pole portion 20C.

Timing t4

Figure 7:
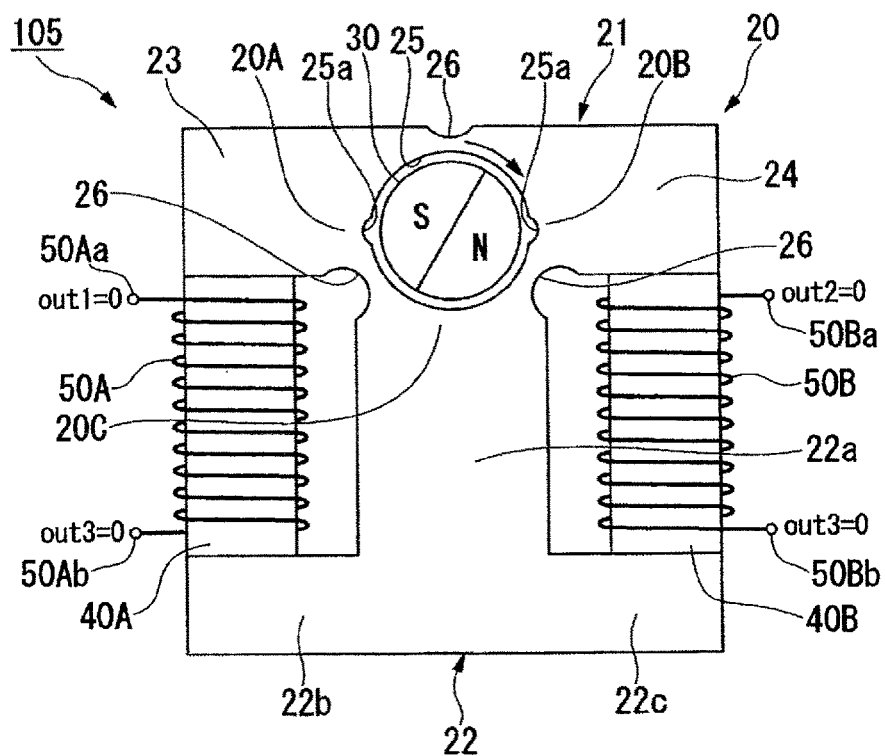
FIG. 7 is an operation diagram of the stepping motor according to the embodiment.
Figure 8:
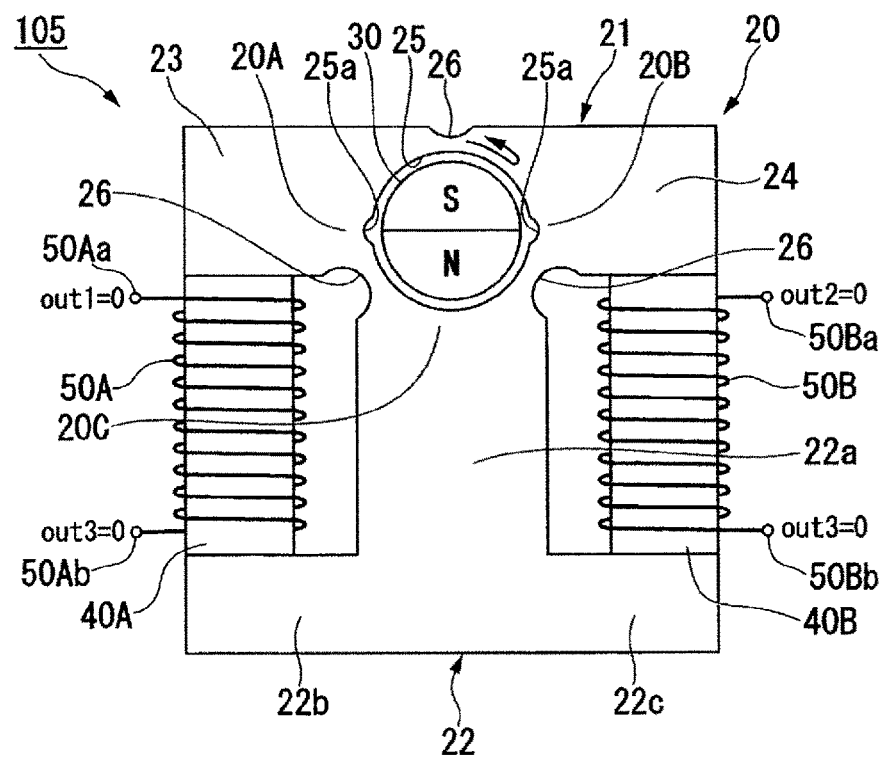
FIG. 8 is an operation diagram of the stepping motor according to the embodiment.

After the first initial repulsive pulse is applied, that is, at timing t4 after Time T3 has elapsed from timing t3, the drive pulse generation circuit 104 stops applying the pulse (out1=0, out2=0, out3=0). Then, as illustrated in FIG. 7, the rotor 30 is rotated in a predetermined rotation direction toward the second stop position where the potential energy decreases. As illustrated in FIG. 8, the rotor 30 rotated to the vicinity of the second stop position performs free vibration in the vicinity of the second stop position. The free vibration of the rotor 30 generates an inductive voltage in the respective coils 50A and 50B. The inductive voltage generated in the respective coils 50A and 50B is detected by the rotation detection circuit 111. The control circuit 103 detects a rotation state of the rotor 30 until timing t5 after Time T4 has elapsed, based on a signal detected by the rotation detection circuit 111. A period during which the rotation state is detected is referred to as a rotation detection period.

Here, the rotation detection period will be described. During the rotation detection period, a drive coil on the rotation side which generates a drive pulse contributing to rotation is switched from a state of being connected to a power source to a state of being connected to a detection resistor (not illustrated). For example, at timing t4, a circuit is switched so that the detection resistor is connected between the first terminal 50Aa of the first coil 50A and the second terminal 50Ab of the first coil 50A. In this manner, a close circuit is formed between the first coil 50A and the detection resistor. A voltage of this closed circuit is detected from the terminal 50Aa and the terminal 50Ab. Accordingly, it is possible to detect the rotation state. The detection resistor takes a role to amplify the inductive voltage. Two types of a high-impedance element and a low-impedance element are prepared for the detection resistor. A first closed circuit including the high-impedance element and a drive coil (for example, the first coil 50A) and a second closed circuit including the low-impedance element and a drive circuit (similarly, the first coil 50A) are alternately switched therebetween every predetermined time. In this manner, it is possible to amplify an output of the inductive voltage (so-called chopping amplification). In an initial period of the rotation detection period, in order to stabilize the motion of the rotor 30, a stabilized period while the drive coil is connected to neither the power source nor the detection resistor may be provided.

In addition, during the rotation detection period, the other coil (in the above-described case, the second coil 50B) from which the drive pulse is not output is brought into a non-connected state (floating state or open state) after the drive pulse is output from the drive coil on the rotation side (timing t4) so as not to affect the inductive voltage generated in the drive coil on the rotation side.

Figure 14:
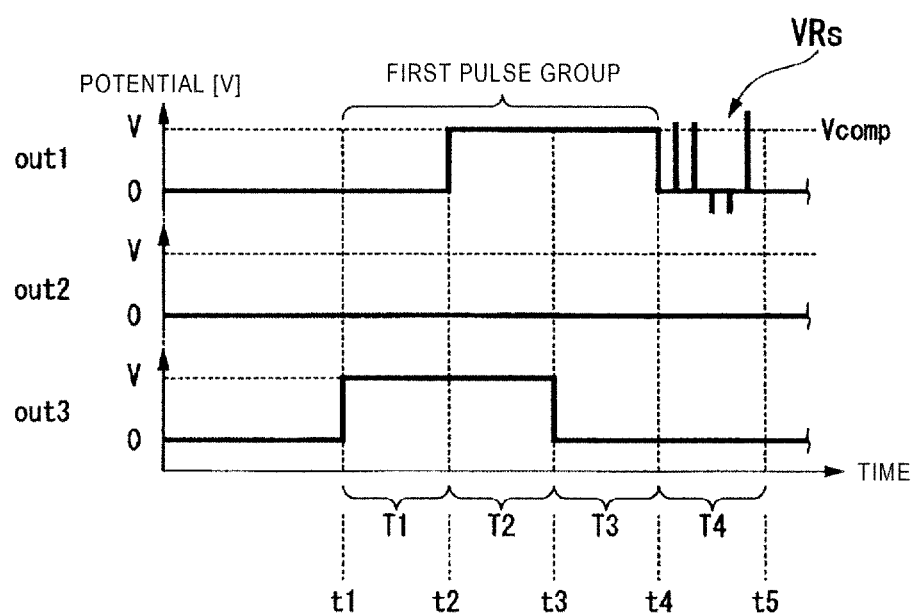
FIG. 14 is a time chart of a control process of the analog timepiece according to the embodiment, and illustrates an example of a waveform of a detected inductive voltage.
Figure 15:
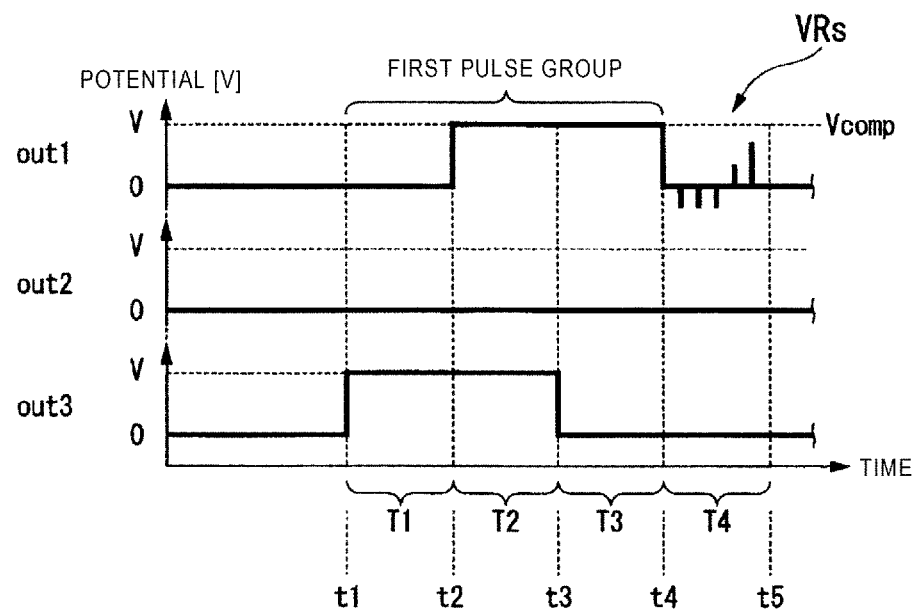
FIG. 15 is a time chart of a control process of the analog timepiece according to the embodiment, and illustrates an example of a waveform of a detected inductive voltage.

FIGS. 14 and 15 are time charts of a control process of the analog timepiece according to the embodiment, and illustrate an example of a waveform of the detected inductive voltage. FIGS. 14 and 15 illustrate a relationship between a voltage waveform (VRs) obtained by performing chopping amplification on the inductive voltage and a predetermined threshold voltage (Vcomp) to be compared with a voltage value thereof. In the illustrated example, the threshold voltage (Vcomp) is equal to a voltage V of the first braking pulse, the first initial suction pulse, and the first initial repulsive pulse which configure the first pulse group. However, without being limited thereto, the threshold voltage (Vcomp) may be set so as to properly detect the voltage waveform (VRs) of the generated inductive voltage, and may be different from the voltage V.

As illustrated in FIG. 14, in a case where it can be determined that the rotor 30 is rotated, the rotation speed of the rotor 30 is fast. Accordingly, the inductive voltage is output high at early timing. This voltage waveform (VRs) and the threshold voltage (Vcomp) are compared with each other. In this manner, it is possible to determine whether or not the inductive voltage is output (hereinafter, the process is the same).

On the other hand, in a case where it is determined that the rotor 30 is not rotated in a desired manner as illustrated in FIG. 15, the rotor 30 is operated to return to the initial position (first stop position) after stopping once, for example. Accordingly, the rotation speed of the rotor 30 is slow, and the inductive voltage is output low at late timing.

In this way, the output amount or the timing of the inductive voltage generated in the drive coil (for example, the first coil 50A) is appropriately detected. In this manner, it is possible to detect the rotation state of the rotor 30.

In a case where the control circuit 103 determines that the rotor 30 is not rotated one unit step (180°) from the first stop position, the control circuit 103 controls the drive pulse generation circuit 104 to output the correction drive pulse group for rotating the rotor 30 again after the rotation detection period is completed (that is, after timing t5).

According to the above-described configuration, the rotor 30 can be rotated one unit step from the first stop position toward the second stop position.

Next, a second pulse group (second braking pulse, second initial suction pulse, and second initial repulsive pulse) is applied to the respective coils 50A and 50B, thereby rotating the rotor 30 one unit step from the first stop position toward the second stop position.

Timing t6

First, the control unit 112 performs the braking pulse application step. At timing t6 after one second from timing t1, the drive pulse generation circuit 104 applies the second braking pulse having the pulse width T1 to the respective coils 50A and 50B. As the second braking pulse, the drive pulse generation circuit 104 applies a predetermined voltage V to the first terminal 50Aa of the first coil 50A and the first terminal 50Ba of the second coil 50B (out1=V, out2=V, out3=0). In this manner, a current flows from the first terminal 50Aa toward the second terminal 50Ab in the first coil 50A. In addition, a current flows from the first terminal 50Ba toward the second terminal 50Bb in the second coil 50B.

Figure 9:
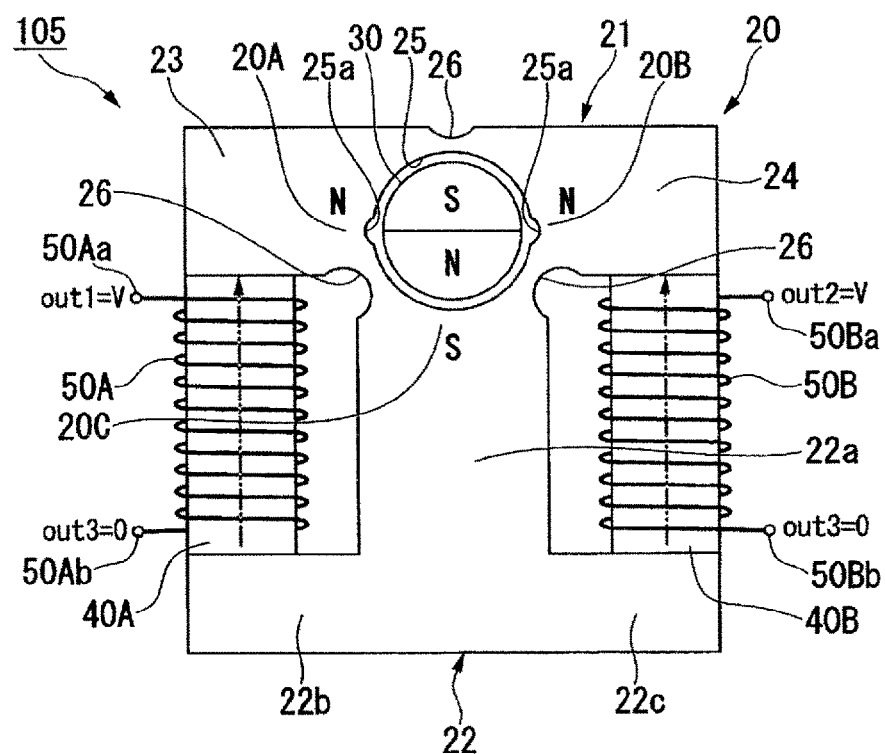
FIG. 9 is an operation diagram of the stepping motor according to the embodiment.

As illustrated in FIG. 9, the second braking pulse is applied to the respective coils 50A and 50B, thereby exciting the first magnetic pole portion 20A and the second magnetic pole portion 20B which are disposed to face the S-pole of the rotor 30 so as to have the N-pole. In addition, the third magnetic pole portion 20C disposed to face the N-pole of the rotor 30 is excited so as to have the S-pole. As a result, the rotor 30 is attracted to the second stop position.

Timing t7

Subsequently, the control unit 112 performs the rotary pulse application step. After the second braking pulse is applied, that is, at timing t7 after Time T1 has elapsed from timing t6, the drive pulse generation circuit 104 applies the second initial suction pulse having the pulse width T2 to the respective coils 50A and 50B. As the second initial suction pulse, the drive pulse generation circuit 104 applies a predetermined voltage V to the first terminal 50Ba of the second coil 50B (out1=0, out2=V, out3=0). In this manner, the first coil 50A is brought into a non-energized state. In addition, a current flows from the first terminal 50Ba toward the second terminal 50Bb in the second coil 50B.

Figure 10:
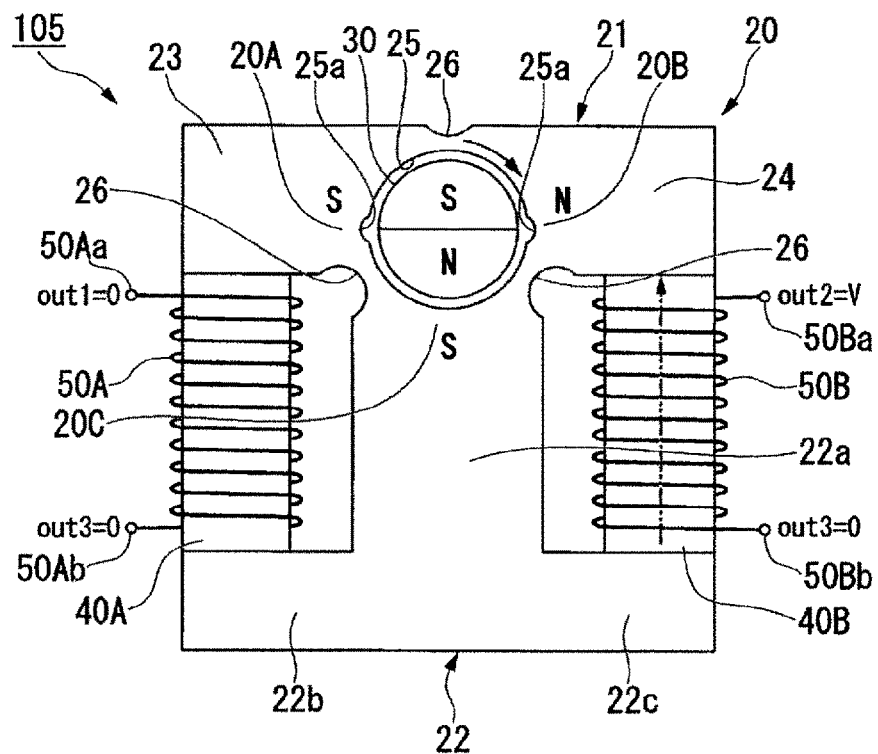
FIG. 10 is an operation diagram of the stepping motor according to the embodiment.

As illustrated in FIG. 10, the second initial suction pulse is applied to the respective coils 50A and 50B, thereby exciting the first magnetic pole portion 20A and the third magnetic pole portion 20C so as to have the S-pole. In addition, the second magnetic pole portion 20B is excited so as to have the N-pole. As a result, the rotor 30 is rotated, for example, as much as approximately 60° in a predetermined rotation direction so that the S-pole of the rotor 30 is sucked by the second magnetic pole portion 20B after being separated from the first magnetic pole portion 20A and so that the N-pole of the rotor 30 is sucked by the first magnetic pole portion 20A and the third magnetic pole portion 20C.

Timing t8

After the second initial suction pulse is applied, that is, at timing t8 after Time T2 has elapsed from timing t7, the drive pulse generation circuit 104 applies the second initial repulsive pulse having the pulse width T3 to the respective coils 50A and 50B. As the second initial repulsive pulse, the drive pulse generation circuit 104 applies the predetermined voltage V to the first terminal 50Ba of the second coil 50B, and applies the predetermined voltage V to the respective second terminals 50Ab and 50Bb (out1=0, out2=V, out3=V). In this manner, a current flows from the second terminal 50Bb toward the first terminal 50Aa in the first coil 50A. In addition, in the second coil 50B, both terminals 50Ba and 50Bb have the same potential, and the second coil 50B is brought into a non-energized state.

Figure 11:
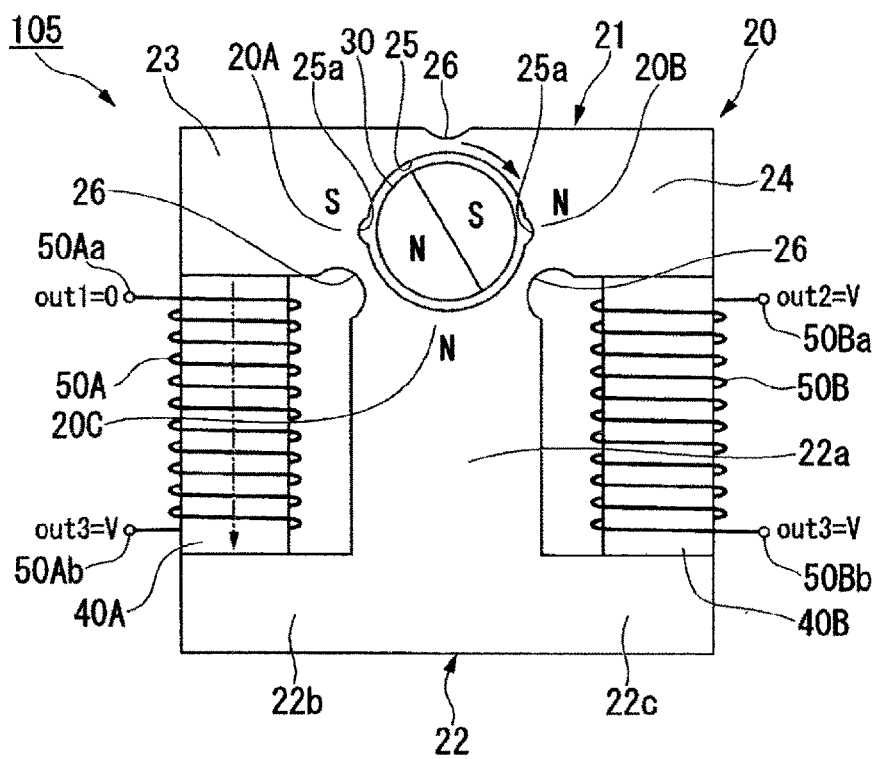
FIG. 11 is an operation diagram of the stepping motor according to the embodiment.

As illustrated in FIG. 11, the second initial repulsive pulse is applied to the respective coils 50A and 50B, thereby exciting the first magnetic pole portion 20A so as to have the S-pole. In addition, the second magnetic pole portion 20B and the third magnetic pole portion 20C are excited so as to have the N-pole. As a result, the rotor 30 is rotated, for example, as much as approximately 60° in a predetermined rotation direction so that the S-pole of the rotor 30 is sucked by the second magnetic pole portion 20B and so that the N-pole of the rotor 30 is sucked by the first magnetic pole portion 20A after being separated from the third magnetic pole portion 20C.

Timing t9

Figure 12:
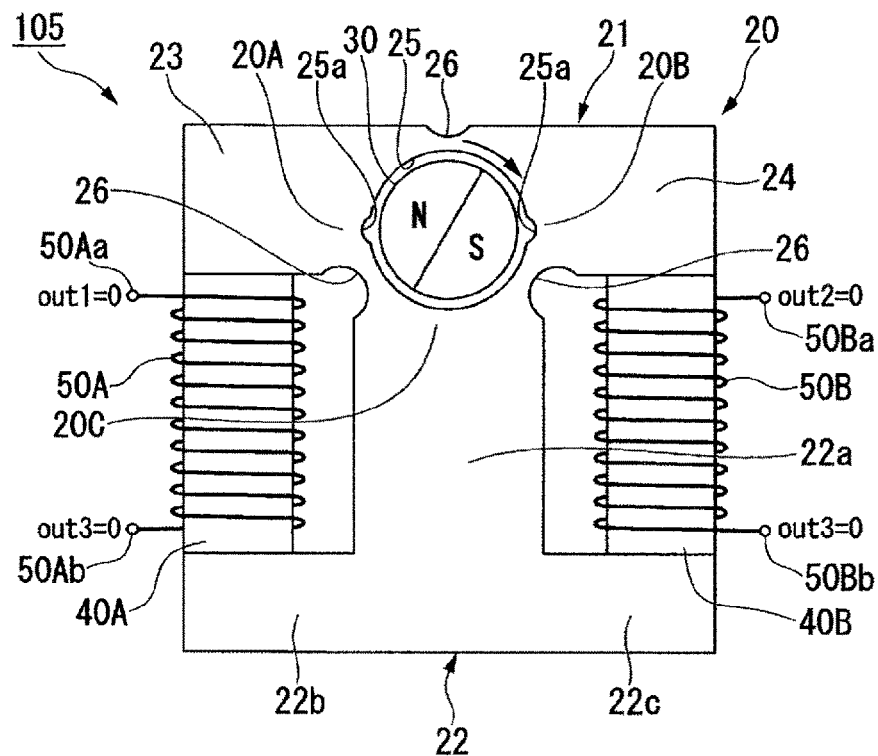
FIG. 12 is an operation diagram of the stepping motor according to the embodiment.
Figure 13:
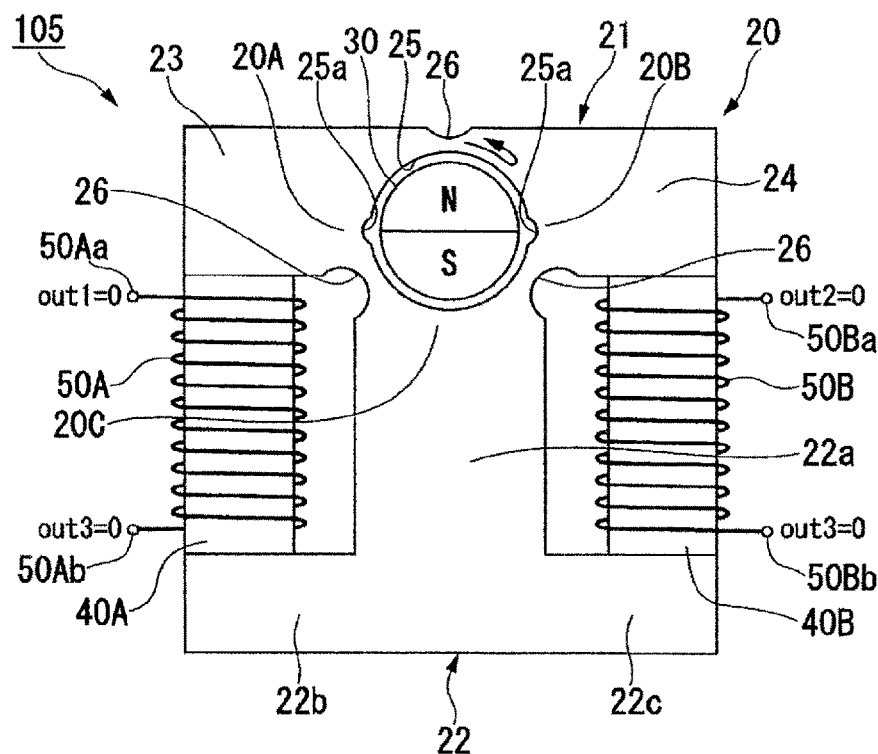
FIG. 13 is an operation diagram of the stepping motor according to the embodiment.

After the second initial repulsive pulse is applied, that is, at timing t9 after Time T3 has elapsed from timing t8, the drive pulse generation circuit 104 stops applying the pulse (out1=0, out2=0, out3=0). Then, as illustrated in FIG. 12, the rotor 30 is rotated in a predetermined rotation direction toward the first stop position where the potential energy decreases. As illustrated in FIG. 13, the rotor 30 rotated to the vicinity of the first stop position performs free vibration in the vicinity of the first stop position. The free vibration of the rotor 30 generates the inductive voltage in the respective coils 50A and 50B. The inductive voltage generated in the respective coils 50A and 50B is detected by the rotation detection circuit 111, similarly to that during the above-described rotation detection period. The control circuit 103 detects a rotation state of the rotor 30 until timing t10 after Time T4 has elapsed, based on a signal detected by the rotation detection circuit 111.

In a case where the control circuit 103 determines that the rotor 30 is not rotated one unit step from the second stop position, the control circuit 103 controls the drive pulse generation circuit 104 to output the correction drive pulse group for rotating the rotor 30 again after the rotation detection period is completed (that is, after timing t10).

According to the above-described configuration, the rotor 30 can be rotated one unit step from the second stop position toward the first stop position. Then, the second hand 109 can be operated at 1 Hz by repeatedly performing the above-described control process.

In this way, the analog timepiece 1 according to the present embodiment is configured to control each unit step of the rotor 30 in accordance with each pulse group in such a way that the control unit 112 applies the pulse group including the rotary pulse for rotating the rotor 30 and the braking pulse for braking the rotation of the rotor 30, which is applied before the rotary pulse is applied, to the respective coils 50A and 50B.

In addition, the control method of the analog timepiece 1 according to the present embodiment is configured to have the drive step including the braking pulse application step of applying the braking pulse to the respective coils 50A and 50B and the rotary pulse application step of applying the rotary pulse to the respective coils 50A and 50B before the braking pulse application step.

As in the related art, in a case of the configuration in which the braking pulse is applied after the rotary pulse is applied, if the braking pulse is applied after the rotary pulse within a period while the pulse group is applied once, the free vibration of the rotor is insufficiently generated. Consequently, the voltage waveform (VRs) of the inductive voltage exceeding the predetermined threshold voltage (Vcomp) is not properly generated.

In contrast, according to the configuration of the present embodiment, the control unit 112 applies the pulse group including the rotary pulse for rotating the rotor 30 and the braking pulse for braking the rotation of the rotor 30, which is applied before the rotary pulse is applied, to the respective coils 50A and 50B. In this manner, the control unit 112 controls each unit step of the rotor 30 in accordance with each pulse group. Therefore, not only the rotor 30 can be stopped at the regulated first stop position or the regulated second stop position by the braking pulse, but also the rotor 30 can be rotated by the rotary pulse. After the rotary pulse is applied to the respective coils 50A and 50B, it is possible to stop exciting the respective magnetic pole portions 20A to 20C. In this manner, the free vibration can be secured for each unit step of the rotor 30 so as to reliably generate the inductive voltage in the above-described drive coil. Therefore, the rotor 30 can be reliably rotated one unit step by properly detecting the inductive voltage generated in the drive coil and determining the rotation state of the rotor 30, based on the inductive voltage.

Here, for example, in a state where the respective magnetic pole portions 20A to 20C are not excited, in some cases, the rotor 30 is deviated from the stop position due to an external magnetic field. According to the present embodiment, when the pulse group is applied to the respective coils 50A and 50B, the braking pulse is applied to the respective coils 50A and 50B before the rotary pulse is applied. Accordingly, the position of the rotor 30 at the time of applying the rotary pulse to the respective coils 50A and 50B can be stably set to the stop position. Therefore, it is possible to prevent the rotor 30 from being out of step, and the rotor 30 can be reliably rotated by the rotary pulse.

In addition, after the pulse group is applied to the respective coils 50A and 50B, the rotation state of the rotor 30 is detected by the control unit 112, based on the inductive voltage generated in the respective coils 50A and 50B by the free vibration of the rotor 30. Accordingly, it is possible to determine whether or not the rotor 30 is rotated one unit step. In this manner, the rotor 30 can be reliably rotated every unit step by applying the pulse for rotating the rotor 30 again in a case where the rotor 30 is not rotated one unit step.

In addition, the braking pulse excites the respective magnetic pole portions 20A to 20C so that the first magnetic pole portion 20A and the second magnetic pole portion 20B have a pole which is different from one magnetic pole of the rotor 30 disposed to face the respective magnetic pole portions 20A and 20B and so that the third magnetic pole portion 20C has a pole which is different from the other magnetic pole of the rotor 30 disposed to face the third magnetic pole portion 20C. Accordingly, the rotor 30 can be attracted to and reliably stopped at the predetermined stop position. In addition, the rotary pulse excites the respective magnetic pole portions 20A to 20C so that the first magnetic pole portion 20A has a pole which is the same as one magnetic pole of the rotor 30 disposed to face the first magnetic pole portion 20A. Accordingly, the rotor 30 can be rotated from the stop position so that one magnetic pole of the rotor 30 is separated from the first magnetic pole portion 20A. Therefore, it is possible to configure the pulse group for rotating the above-described rotor 30 one unit step.

First Modification Example of Embodiment

Figure 16:
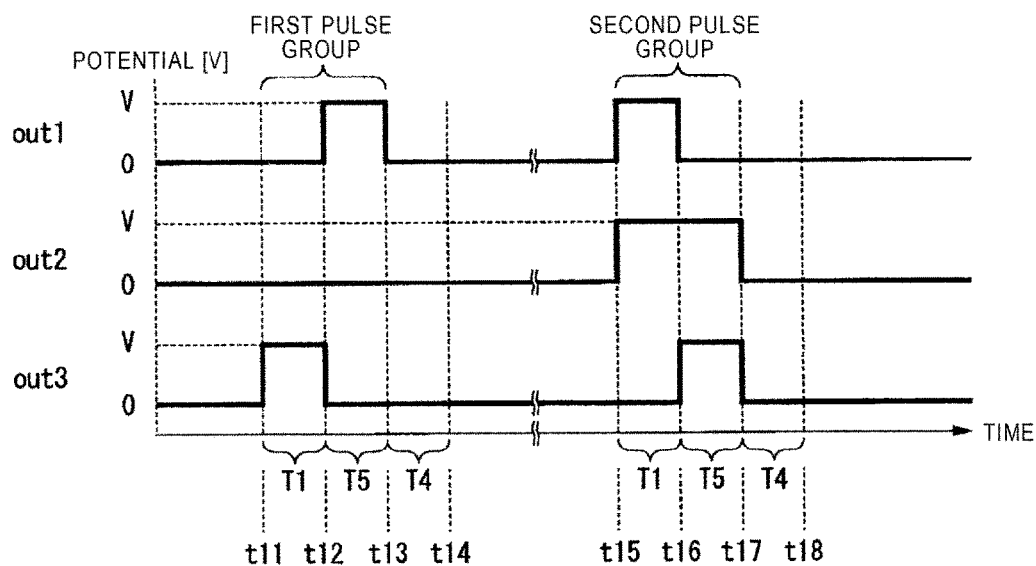
FIG. 16 is a time chart of a control process of an analog timepiece according to a first modification example of the embodiment.

FIG. 16 is a time chart of a control process of an analog timepiece according to a first modification example of the embodiment. FIGS. 17 to 20 are operation diagrams of a stepping motor according to the first modification example of the embodiment. In FIGS. 17 to 20, a two-dot chain line arrow illustrates a direction of the magnetic flux generated from the respective coils 50A and 50B.

According to the above-described embodiment, in the rotary pulse application step, the drive pulse generation circuit 104 first applies the first initial suction pulse or the second initial suction pulse, but the configuration is not limited thereto. Hereinafter, a control method of the analog timepiece 1 according to the first modification example of the embodiment will be described with reference to FIG. 16.

According to the control method of the analog timepiece 1 in the present modification example, as the rotary pulse, the first initial repulsive pulse or the second initial repulsive pulse is applied to the respective coils 50A and 50B.

At first, the first pulse group (first braking pulse and first initial repulsive pulse) is applied to the respective coils 50A and 50B, thereby rotating the rotor 30 one unit step from the first stop position toward the second stop position.

Timing t11

First, the control unit 112 performs the braking pulse application step. At timing t11, the drive pulse generation circuit 104 applies the first braking pulse to the respective coils 50A and 50B. The first braking pulse according to the present modification example is the same as the first braking pulse according to the above-described embodiment (out1=0, out2=0, out3=V). In this manner, as illustrated in FIG. 4, the rotor 30 is attracted to the first stop position.

Timing t12

Subsequently, the control unit 112 performs the rotary pulse application step. After the first braking pulse is applied, that is, at timing t12 after Time T1 has elapsed from timing t11, the drive pulse generation circuit 104 applies the first initial repulsive pulse having a pulse width T5 to the respective coils 50A and 50B. According to the present modification example, as the first initial repulsive pulse, similarly to the first initial repulsive pulse according to the above-described embodiment, the drive pulse generation circuit 104 applies a predetermined voltage V to the first terminal 50Aa of the first coil 50A (out1=V, out2=0, out3=0).

Figure 17:
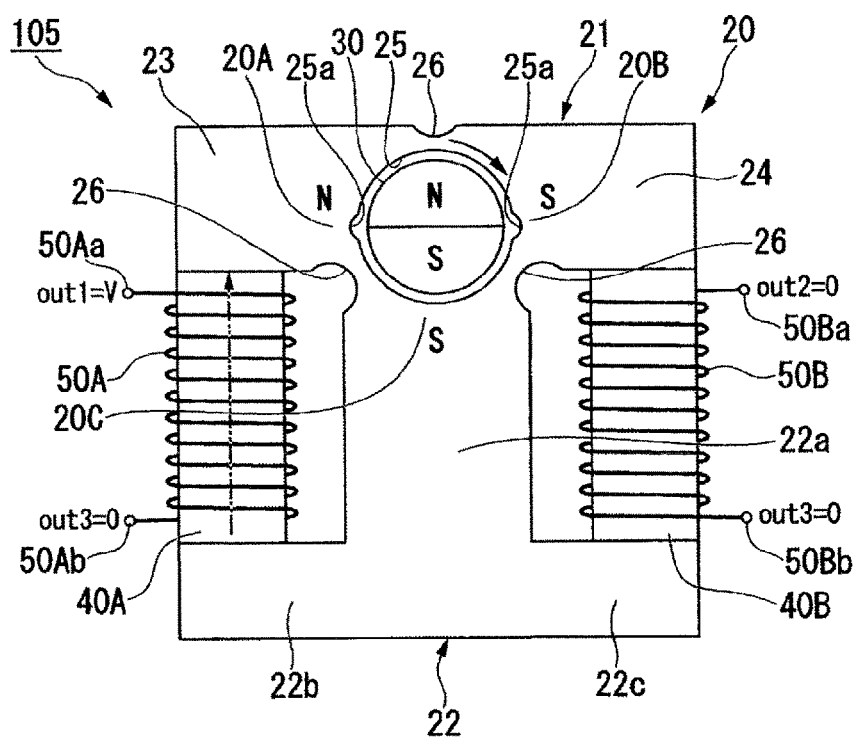
FIG. 17 is an operation diagram of a stepping motor according to the first modification example of the embodiment.

As illustrated in FIG. 17, the first initial repulsive pulse is applied to the respective coils 50A and 50B, thereby exciting the first magnetic pole portion 20A so as to have the N-pole. In addition, the second magnetic pole portion 20B and the third magnetic pole portion 20C are excited so as to have the S-pole. As a result, the rotor 30 is rotated, for example, as much as approximately 60° in a predetermined rotation direction so that the N-pole of the rotor 30 is sucked by the second magnetic pole portion 20B after being separated from the first magnetic pole portion 20A and so that the S-pole of the rotor 30 is sucked by the first magnetic pole portion 20A after being separated from the third magnetic pole portion 20C. The pulse width T5 may be longer than, shorter than, or equal to the pulse width T2 according to the above-described embodiment.

Timing t13

Figure 18:
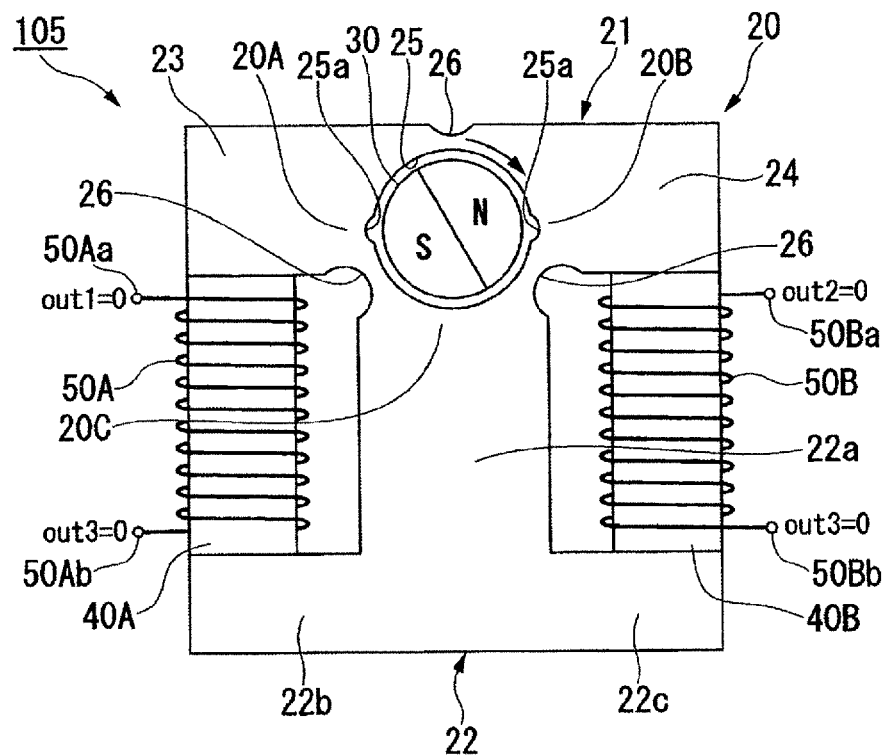
FIG. 18 is an operation diagram of the stepping motor according to the first modification example of the embodiment.

After the first initial repulsive pulse is applied, that is, at timing t13 after Time T5 has elapsed from timing t12, the drive pulse generation circuit 104 stops applying the pulse (out1=0, out2=0, out3=0). Then, as illustrated in FIG. 18, the rotor 30 is rotated by inertia in a predetermined rotation direction, and is further rotated in the predetermined rotation direction toward the second stop position where the potential energy decreases. Similarly to the above-described embodiment, as illustrated in FIG. 8, the rotor 30 rotated to the vicinity of the second stop position performs free vibration in the vicinity of the second stop position. The free vibration of the rotor 30 can generate the inductive voltage in the respective coils 50A and 50B. Similarly to the rotation detection period according to the above-described embodiment, the control circuit 103 detects the rotation state of the rotor 30 until timing t14 after Time T4 has elapsed. Then, in a case where the control circuit 103 determines that the rotor 30 is not rotated one unit step from the second stop position, the control circuit 103 controls the drive pulse generation circuit 104 to output the correction drive pulse group for rotating the rotor 30 again after the rotation detection period is completed (that is, after timing t14).

According to the above-described configuration, the rotor 30 can be rotated one unit step from the first stop position toward the second stop position.

Next, the second pulse group (second braking pulse and second initial repulsive pulse) is applied to the respective coils 50A and 50B, thereby rotating the rotor 30 one unit step from the second stop position toward the first stop position.

Timing t15

First, the control unit 112 performs the braking pulse application step. At timing t15 after one second from timing t11, the drive pulse generation circuit 104 applies the second braking pulse to the respective coils 50A and 50B. The second braking pulse according to the present modification example is the same as the second braking pulse according to the above-described embodiment (out1=V, out2=V, out3=0). In this manner, as illustrated in FIG. 9, the rotor 30 is attracted to the second stop position.

Timing t16

Subsequently, the control unit 112 performs the rotary pulse application step. After the second braking pulse is applied, that is, at timing t16 after Time T1 has elapsed from timing t15, the drive pulse generation circuit 104 applies the second initial repulsive pulse having the pulse width T5 to the respective coils 50A and 50B. According to the present modification example, as the second initial repulsive pulse, similarly to the second initial repulsive pulse according to the above-described embodiment, the drive pulse generation circuit 104 applies a predetermined voltage V to the first terminal 50Ba of the second coil 50B, and applies the predetermined voltage V to the respective second terminals 50Ab and 50Bb (out1=0, out2=V, out3=V).

Figure 19:
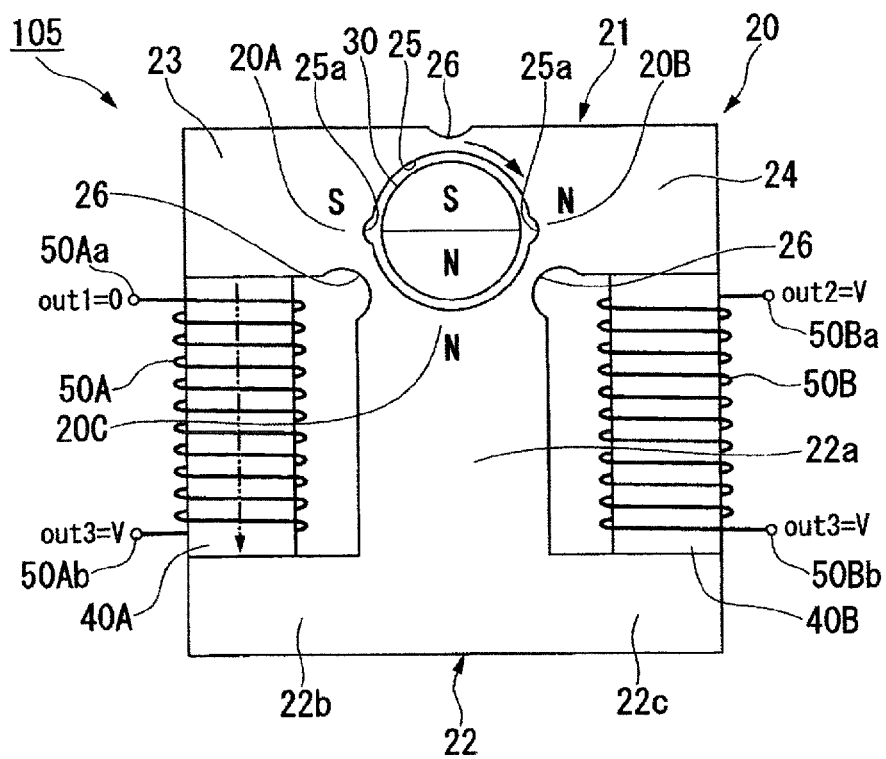
FIG. 19 is an operation diagram of the stepping motor according to the first modification example of the embodiment.

As illustrated in FIG. 19, the second initial repulsive pulse is applied to the respective coils 50A and 50B, thereby exciting the first magnetic pole portion 20A so as to have the S-pole. In addition, the second magnetic pole portion 20B and the third magnetic pole portion 20C are excited so as to have the N-pole. As a result, the rotor 30 is rotated, for example, as much as approximately 60° in a predetermined rotation direction so that the S-pole of the rotor 30 is sucked by the second magnetic pole portion 20B after being separated from the first magnetic pole portion 20A and so that the N-pole of the rotor 30 is sucked by the first magnetic pole portion 20A after being separated from the third magnetic pole portion 20C.

Timing t17

Figure 20:
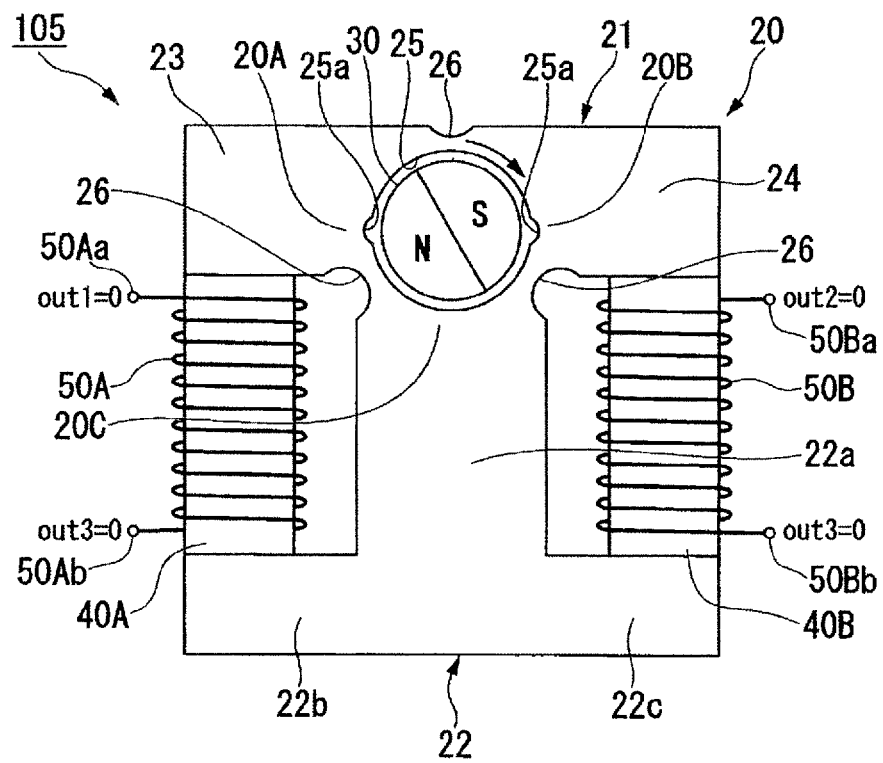
FIG. 20 is an operation diagram of the stepping motor according to the first modification example of the embodiment.

After the second initial repulsive pulse is applied, that is, at timing t17 after Time T5 has elapsed from timing t16, the drive pulse generation circuit 104 stops applying the pulse (out1=0, out2=0, out3=0). Then, as illustrated in FIG. 20, the rotor 30 is rotated by inertia in a predetermined rotation direction, and is further rotated in the predetermined rotation direction toward the first stop position where the potential energy decreases. Similarly to the above-described embodiment, as illustrated in FIG. 13, the rotor 30 rotated to the vicinity of the first stop position performs free vibration in the vicinity of the first stop position. The free vibration of the rotor 30 can generate the inductive voltage in the respective coils 50A and 50B. Similarly to the rotation detection period according to the above-described embodiment, the control circuit 103 detects the rotation state of the rotor 30 until timing t18 after Time T4 has elapsed. Then, in a case where the control circuit 103 determines that the rotor 30 is not rotated one unit step from the second stop position, the control circuit 103 controls the drive pulse generation circuit 104 to output the correction drive pulse group for rotating the rotor 30 again after the rotation detection period is completed (that is, after timing t18).

According to the above-described configuration, the rotor 30 can be rotated one unit step from the second stop position toward the first stop position. Then, the second hand 109 can be operated at 1 Hz by repeatedly performing the above-described control process.

In this way, according to the present modification example, the rotary pulse (first initial repulsive pulse and second initial repulsive pulse) excites the respective magnetic pole portions 20A to 20C so that the first magnetic pole portion 20A has a pole which is the same as one magnetic pole of the rotor 30. Accordingly, the rotor 30 can be rotated from the stop position so that one magnetic pole of the rotor 30 is separated from the first magnetic pole portion 20A. Therefore, it is possible to configure the pulse group for rotating the above-described rotor 30 one unit step.

Second Modification Example of Embodiment

Figure 21:
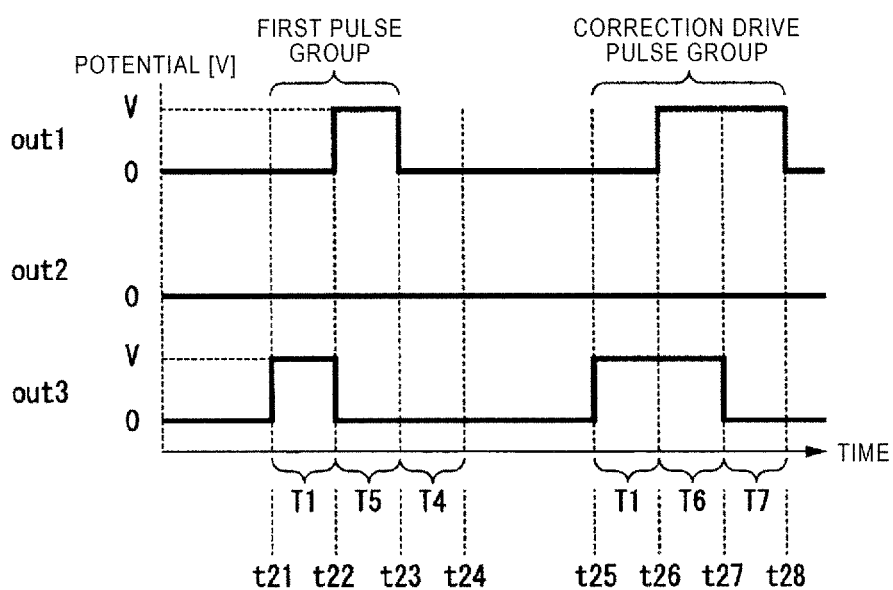
FIG. 21 is a time chart of a control process of an analog timepiece according to a second modification example of the embodiment.

FIG. 21 is a time chart of a control process of an analog timepiece according to a second modification example of the embodiment.

According to the embodiment illustrated in FIG. 3 and the first modification example of the embodiment which is illustrated in FIG. 16, the rotor 30 is rotated one unit step by the pulse group, and the control unit 112 does not apply the correction drive pulse group for rotating the rotor 30 again to the respective coils 50A and 50B. In contrast, according to the second modification example which is illustrated in FIG. 21, the correction drive pulse group is applied after the pulse group is applied. This point is different from that according to the embodiment and the first modification example. The same reference numerals will be given to the configuration which are the same as those according to the first modification example of the above-described embodiment, and detailed description thereof will be omitted. In addition, hereinafter, a period while each unit step of the rotor 30 is controlled by the control unit 112 is referred to as a "unit frame". That is, according to the present modification example, the unit frame corresponds to a period from timing that the first pulse group is applied until timing that the second pulse group is applied, and a period from timing that the second pulse group is applied until timing that the first pulse group is applied.

According to the present modification example, the control unit 112 applies the first pulse group (first braking pulse and first initial repulsive pulse) or the second pulse group (second braking pulse and second initial repulsive pulse) similar to that according to the first modification example of the embodiment, to the respective coils 50A and 50B. As illustrated in FIG. 21, in the following description, the unit frame in which the control unit 112 applies the first pulse group to the respective coils 50A and 50B will be described as an example.

At first, the first pulse group (first braking pulse and first initial repulsive pulse) is applied to the respective coils 50A and 50B, thereby rotating the rotor 30 one unit step from the first stop position toward the second stop position.

Timing t21

First, the control unit 112 performs the braking pulse application step. At timing t21, the drive pulse generation circuit 104 applies the first braking pulse to the respective coils 50A and 50B. The first braking pulse according to the present modification example is the same as the first braking pulse according to the first modification example of the above-described embodiment (out1=0, out2=0, out3=V).

Timing t22

Subsequently, the control unit 112 performs the rotary pulse application step. After the first braking pulse is applied, that is, at timing t22 after Time T1 has elapsed from timing t21, the drive pulse generation circuit 104 applies the first initial repulsive pulse to the respective coils 50A and 50B. The first initial repulsive pulse according to the present modification example is the same as the first initial repulsive pulse according to the first modification example of the above-described embodiment (out1=V, out2=0, out3=0). In this manner, the control unit 112 rotates the rotor 30 one unit step from the first stop position toward the second stop position. The pulse width T5 is changed in accordance with a pulse rank (to be described later).

Timing t23

After the first initial repulsive pulse is applied, that is, at timing t23 after Time T5 has elapsed from timing t22, the drive pulse generation circuit 104 stops applying the pulse, and detects the rotation state of the rotor 30 until timing t24 after Time T4 has elapsed (rotation detection period).

In accordance with a detection result of the inductive voltage generated in the respective coils 50A and 50B, the drive pulse generation circuit 104 applies the correction drive pulse group to the respective coils 50A and 50B. Specifically, in a case where the control circuit 103 determines that the rotor 30 is not rotated one unit step (180°) from the first stop position, the control circuit 103 controls the drive pulse generation circuit 104 to output the correction drive pulse group for rotating the rotor 30 again after the rotation detection period is completed (that is, after timing t24). Hereinafter, a case will be described where the rotor 30 is not rotated one unit step (180°) from the first stop position.

Subsequently, the correction drive pulse group is applied to the respective coils 50A and 50B, thereby rotating the rotor 30 one unit step from the first stop position toward the second stop position. The correction drive pulse group includes a correction-purpose rotary pulse for rotating the rotor 30 and a correction-purpose braking pulse for braking the rotation of the rotor 30, which is applied before the correction-purpose rotary pulse is applied. The correction drive pulse group is different from the first pulse group which is applied to the respective coils 50A and 50B immediately before.

Timing t25

The control unit 112 performs a correction-purpose braking pulse application step. At timing t25 subsequent to timing t24, the drive pulse generation circuit 104 applies the correction-purpose braking pulse to the respective coils 50A and 50B. The correction-purpose braking pulse according to the present modification example is the same as the first braking pulse applied during the braking pulse application step (out1=0, out2=0, out3=V). Timing t25 may not coincide with timing t24.

Timing t26

Subsequently, the control unit 112 performs the correction-purpose rotary pulse application step. After the first braking pulse is applied, that is, at timing t26 after Time T1 has elapsed from timing t25, the drive pulse generation circuit 104 applies a correction-purpose initial suction pulse having a pulse width T6 to the respective coils 50A and 50B. According to the present modification example, similarly to the first initial suction pulse according to the above-described embodiment, as the correction-purpose initial suction pulse, the drive pulse generation circuit 104 applies a predetermined voltage V to the first terminal 50Aa of the first coil 50A (out1=V, out2=0, out3=V). The pulse width T6 may be longer than, shorter than, or equal to the pulse width T2 of the first initial suction pulse according to the above-described embodiment.

Timing t27

After the correction-purpose initial suction pulse is applied, that is, at timing t27 after Time T6 has elapsed from timing t26, the drive pulse generation circuit 104 applies a correction-purpose initial repulsive pulse having a pulse width T7 to the respective coils 50A and 50B. Similarly to the first initial repulsive pulse according to the above-described embodiment, as the correction-purpose initial repulsive pulse, the drive pulse generation circuit 104 applies a predetermined voltage V to the first terminal 50Aa of the first coil 50A (out1=V, out2=0, out3=0). The pulse width T7 may be longer than, shorter than, or equal to the pulse width T3 of the first initial repulsive pulse according to the above-described embodiment.

According to the above-described configuration, in a case where the rotor 30 is not rotated one unit step by performing the braking pulse application step and the rotary pulse application step, the rotor 30 can be rotated one unit step by performing the correction-purpose braking pulse application step and the correction-purpose rotary pulse application step.

In the present modification example, a case has been described where the rotor 30 is not rotated one unit step from the first stop position when the control unit 112 applies the first pulse group to the respective coils 50A and 50B. However, the present modification example is similarly applied to a case where the rotor 30 is not rotated one unit step from the second stop position when the control unit 112 applies the second pulse group to the respective coils 50A and 50B.

In addition, in the illustrated examples, Times T1, T4, T5, T6, and T7 are the same as each other. However, for example, Time T4 can be set to be longer than Time T1 or T5, and can be appropriately changed.

Next, the above-described pulse rank will be described in detail. In the following description, a pulse group (first pulse group and second pulse group) applied to the respective coils 50A and 50B for the first time in each unit frame is referred to as a "main drive pulse group". In addition, the first initial repulsive pulse and the second initial repulsive pulse are collectively referred to as an "initial repulsive pulse".

In the present modification example, the pulse width T5 of the initial repulsive pulse in the main drive pulse group is changed in accordance with the number of ranks of the pulse rank. For example, the pulse rank is configured to include 8 ranks. The pulse width T5 increases as the number of ranks of the pulse rank increases. In the following description, the number of ranks of the pulse rank is described as a pulse rank n. In addition, the maximum number of ranks of the pulse rank is described as nmax. In addition, the main drive pulse group is described as P1, and the correction drive pulse group is described as P2.

Figure 22:
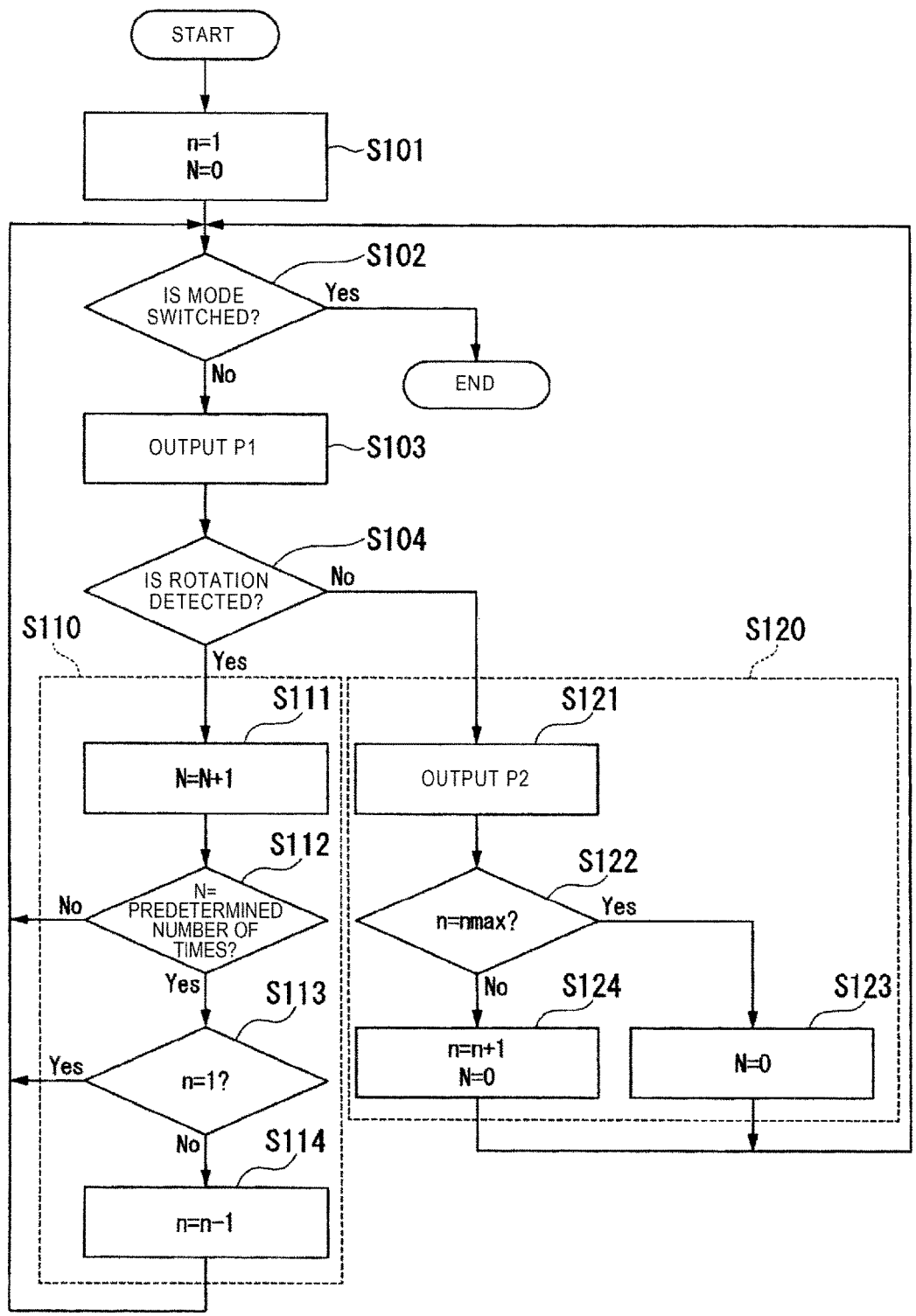
FIG. 22 is a flowchart of a normal hand operation of the analog timepiece according to the second modification example of the embodiment.

FIG. 22 is a flowchart of a normal hand operation of the analog timepiece according to the second modification example of the embodiment.

As illustrated in FIG. 22, the control circuit 103 first causes a storage unit including ROM and RAM to store pulse rank n=1, the number of pulse outputs N=0 (Step S101).

Next, the control circuit 103 determines whether or not a user instructs mode switching (Step S102). For example, the mode switching means switching from a normal time display mode to a time correction mode, a temperature display mode, an altitude display mode, or a compass display mode. The mode switching causes a hand display method to be switched from a normal hand operation to a fast-forward hand operation. The normal hand operation described herein is a hand operation at 1 Hz, and means a hand operation for rotating the rotor 30 one unit step, once within one second. In addition, the fast-forward hand operation means a hand operation for rotating the rotor 30 one unit step, multiple times (for example, 64 times) within one second.

In a case where the control circuit 103 determines that the user instructs the mode switching (S102: Yes), the control circuit 103 completes the normal time display mode. In a case where the control circuit 103 determines that the user does not instruct the mode switching (S102: No), the process proceeds to Step S103.

In Step S103, the drive pulse generation circuit 104 applies the main drive pulse group P1 according to the pulse rank n to the respective coils 50A and 50B (Step S103).

Next, during the rotation detection period, the control circuit 103 detects the rotation state of the rotor 30, and determines whether or not the rotor 30 is rotated (Step S104). In a case where the control circuit 103 determines that the rotor 30 is rotated (S104: Yes), the process proceeds to Step S110. In a case where the control circuit 103 determines that the rotor 30 is not rotated (S104: No), the process proceeds to Step S120.

In Step S110, the control circuit 103 determines whether or not the pulse rank n is to be ranked down. In Step S110, in a case where in Step S103, the drive pulse generation circuit 104 applies the main drive pulse group P1 having the same number of ranks to the respective coils 50A and 50B continuously predetermined number of times, the control circuit 103 ranks down the pulse rank n as many as one rank.

In Step S110, the control circuit 103 first causes the storage unit to store the number of pulse outputs N=N+1 (Step S111). Next, the control circuit 103 determines whether or not the number of pulse outputs N reaches the predetermined number of times (Step S112). In a case where the control circuit 103 determines that the number of pulse outputs N reaches the predetermined number of times (S112: Yes), the process proceeds to Step S113. In a case where the control circuit 103 determines that the number of pulse outputs N does not reach the predetermined number of times (S112: No), the process proceeds to Step S102 again.

In Step S113, the control circuit 103 determines whether or not the pulse rank n is 1. In a case where the pulse rank n is 1, the pulse rank n cannot be ranked down. In a case where the control circuit 103 determines that the pulse rank n is 1 (S113: Yes), the process proceeds to Step S102 again. In a case where the control circuit 103 determines that the pulse rank n is not 1 (S113: No), the control circuit 103 causes the storage unit to store the pulse rank n=n−1 (Step S114), and the process proceeds to Step S102 again.

According to the above-described configuration, in Step S110, only in a case where the pulse rank n is 2 or greater, the pulse rank n is ranked down as many as one rank when in Step S103, the main drive pulse group P1 having the same pulse rank n is applied to the respective coils 50A and 50B continuously the predetermined number of times.

In Step S120, the drive pulse generation circuit 104 first applies the correction drive pulse group P2 to the respective coils 50A and 50B (Step S121). Next, the control circuit 103 determines whether or not the pulse rank n is nmax (Step S122). In a case where the pulse rank n is nmax, the pulse rank n cannot be ranked up. In a case where the control circuit 103 determines that the pulse rank n=nmax is satisfied (S122: Yes), the control circuit 103 causes the storage unit to store the number of pulse outputs N=0 (Step S123), and the process proceeds to Step S102 again. In a case where the control circuit 103 determines that the pulse rank n=nmax is not satisfied (S122: No), the control circuit 103 causes the storage unit to store the pulse rank n=n+1 and the number of pulse outputs N=0 (Step S124), and the process proceeds to Step S102 again.

According to the above-described configuration, in Step S120, in a case where the rotor 30 is not rotated by the main drive pulse group P1, the correction drive pulse group P2 is applied to the respective coils 50A and 50B, and the pulse rank n is ranked up as many as one rank.

In this way, according to the present modification example, in accordance with a detection result of the inductive voltage by which it can be determined whether or not the rotor 30 is rotated one unit step, in every unit frame, the control unit 112 applies the correction drive pulse group for rotating the rotor 30 to the respective coils 50A and 50B. Accordingly, the rotor 30 can be reliably rotated every unit step.

Moreover, according to the present modification example, the correction drive pulse group is configured to include a pulse which is different from that of the main drive pulse group. That is, the rotary pulse applied in the rotary pulse application step is configured to include only the initial repulsive pulse. In contrast, the correction-purpose rotary pulse applied in the correction-purpose rotary pulse application step is configured to include the correction-purpose initial suction pulse and the correction-purpose initial repulsive pulse. Therefore, compared to a case where the correction drive pulse group is configured to include a pulse which is the same as that of the main drive pulse group, the rotor 30 which is not rotated by the main drive pulse group can be reliably rotated.

In addition, the present modification example adopts a configuration in which the pulse width T5 of the initial repulsive pulse in the main drive pulse group is changed in accordance with the number of ranks of the pulse rank. The number of ranks of the pulse rank decreases if the rotation of the rotor 30 continuously succeeds using the main drive pulse group, and increases if the rotation of the rotor 30 fails using the main drive pulse group. The pulse width T5 increases as the number of ranks of the pulse rank increases. Therefore, when the rotation of the rotor 30 fails using the main drive pulse group, the control unit 112 can rotate the rotor 30 with high probability using the main drive pulse group in the subsequent unit frame. Accordingly, power consumption can be reduced by reducing the chances of applying the correction drive pulse group to the respective coils 50A and 50B.

Third Modification Example of Embodiment

Figure 23:
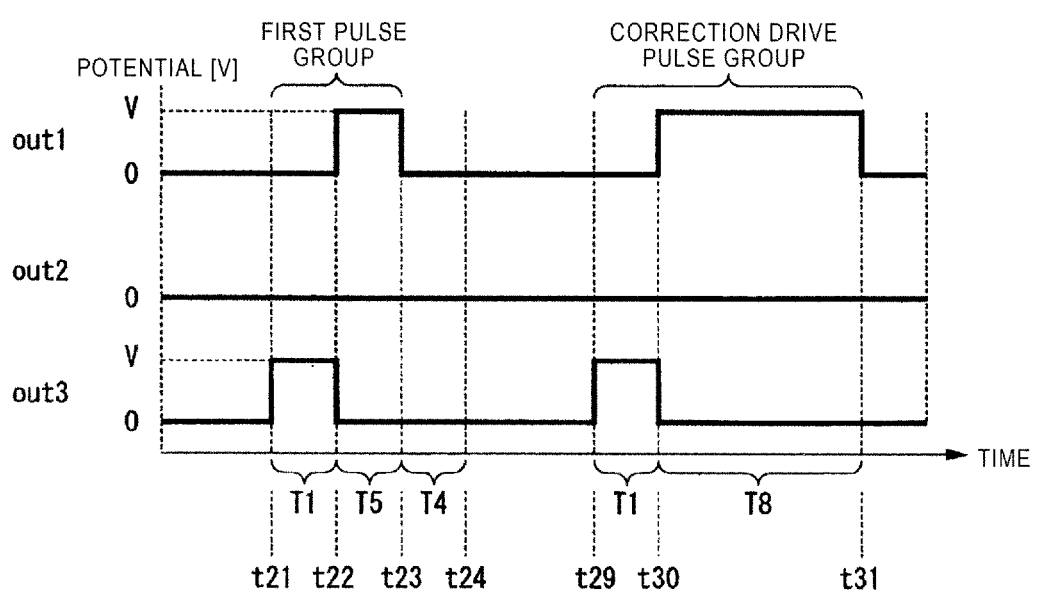
FIG. 23 is a time chart of a control process of an analog timepiece according to a third modification example of the embodiment.

FIG. 23 is a time chart of a control process of an analog timepiece according to a third modification example of the embodiment.

According to the second modification example of the embodiment which is illustrated in FIG. 21, the rotary pulse of the main drive pulse group is configured to include only the initial repulsive pulse, and the correction-purpose rotary pulse of the correction drive pulse group is configured to include the correction-purpose initial suction pulse and the correction-purpose initial repulsive pulse. In contrast, according to the third modification example of the embodiment which is illustrated in FIG. 23, the rotary pulse of the main drive pulse group and the rotary pulse of the correction drive pulse group are configured to include a pulse in which only the pulse width is different. In this regard, the third modification example of the embodiment is different from the second modification example of the embodiment. The same reference numerals will be given to configurations which are the same as those according to the second modification example of the above-described embodiment, and detailed description thereof will be omitted.

As illustrated in FIG. 23, the correction drive pulse group according to the present modification example includes the correction-purpose rotary pulse for rotating the rotor 30 and the correction-purpose braking pulse for braking the rotation of the rotor 30, which is applied before the correction-purpose rotary pulse is applied. The correction-purpose braking pulse is the same as the correction-purpose braking pulse according to the second modification example of the embodiment. That is, the correction-purpose braking pulse is the same as the braking pulse of the main drive pulse group. The correction-purpose rotary pulse is different from the rotary pulse of the main drive pulse group in that only the pulse width is different. A pulse width T8 of the correction-purpose rotary pulse is larger than the pulse width T5 of the rotary pulse of the main drive pulse group. Accordingly, the correction drive pulse group is different from the main drive pulse group which is applied to the respective coils 50A and 50B immediately before.

In this way, according to the present modification example, the correction drive pulse group is configured to include a pulse which is different from that of the main drive pulse group. That is, in the rotary pulse application step, the rotary pulse having the pulse width T5 is applied to the respective coils 50A and 50B. In contrast, in the correction-purpose rotary pulse application step, the correction-purpose rotary pulse having the pulse width T8 which is larger than the pulse width T5 is applied to the respective coils 50A and 50B. Therefore, compared to a case where the correction drive pulse group is configured to include a pulse which is the same as that of the main drive pulse group, the rotor 30 which is not rotated by the main drive pulse group can be reliably rotated.

The second modification example and the third modification example of the above-described embodiment may be combined with each other.

For example, a configuration may be adopted as follows. In a case where it is determined that the rotor 30 is not rotated during the rotation detection period, as the correction drive pulse group to be applied to the respective coils 50A and 50B, it is possible to select either the correction drive pulse group according to the second modification example or the correction drive pulse group according to the third modification example. For example, as a reference for selecting the correction drive pulse group, a size of the inductive voltage can serve as the reference. In this case, for example, in accordance with the size of the inductive voltage, a user may select either the correction drive pulse group which can more reliably rotate the rotor 30 or the correction drive pulse group which needs less power consumption.

In addition, the above-described embodiment and the respective modification examples may be combined with each other.

For example, according to the second modification example of the above-described embodiment, the rotary pulse of the main drive pulse group is configured to include the initial repulsive pulse. However, similarly to the embodiment, the rotary pulse may be configured to include the initial suction pulse (first initial suction pulse and second initial suction pulse) and the initial repulsive pulse. In this case, it is desirable to set the pulse width of the correction-purpose rotary pulse of the correction drive pulse group to be larger than the pulse width of the rotary pulse of the main drive pulse group.

In addition, in the above-described embodiment and the respective modification examples, a configuration has been described in which the pulse group including the braking pulse is applied to the respective coils 50A and 50B in each unit frame, but the invention is not limited thereto. For example, during the fast-forward hand operation in the above-described mode switching, the control unit 112 may apply the pulse group including the braking pulse and the rotary pulse to the respective coils 50A and 50B in the first unit frame, and may apply only the rotary pulse to the respective coils 50A and 50B in the second and subsequent unit frames. In this manner, compared to a configuration in which the pulse group including the rotary pulse and the braking pulse is applied to the coil in all of the unit frames during the fast-forward hand operation, a pulse application time is shortened in each unit frame in the second and subsequent unit frames during the fast-forward hand operation. Therefore, a time in each unit frame in the second and subsequent unit frames can be shortened, thereby contributing to a preferable fast-forward hand operation. During the fast-forward hand operation, the rotation detection period may not be provided after the rotary pulse is applied.

The present invention is not limited to the embodiment described with reference to the drawings, and various modification examples are conceivable within the technical scope of the present invention.

For example, in the above-described embodiment, an operation of the stepping motor 105 when the second hand 109 is driven at 1 Hz has been described. However, for example, the second hand 109 can be driven multiple times within one second by shortening a period from timing t5 to timing t6.

In addition, in the above-described embodiment, a case has been described where the rotor 30 is rotated in the predetermined rotation direction. However, the rotor 30 can also be rotated in a direction opposite to the predetermined rotation direction. In this case, a voltage to be applied to the first terminal 50Aa of the first coil 50A and a voltage to be applied to the first terminal 50Ba of the second coil 50B are switched therebetween. In this manner, the rotor 30 can be rotated to the direction opposite to the predetermined rotation direction.

In addition, in the illustrated examples according to the above-described embodiment and the respective modification examples, each pulse is applied with a constant voltage over the entire preset pulse width, but a configuration is not limited thereto. Each pulse may be a chopping pulse. In particular, in a case where the rotary pulse (initial repulsive pulse) according to the second modification example of the above-described embodiment employs the chopping pulse, a configuration may be adopted so that a duty ratio increases in accordance with an increase in the number of ranks of the pulse rank.

In addition, in the above-described embodiment, each pulse group is configured to include the braking pulse and the rotary pulse continuous with the braking pulse. However, without being limited thereto, a demagnetizing pulse for demagnetizing a residual magnetic flux of the respective magnetic pole portions 20A to 20C may be included between the braking pulse and the rotary pulse.

In addition, in order to reliably detect the voltage waveform (VRs) of the generated inductive voltage, timing t5 for defining the rotation detection period can be appropriately set.

In addition, according to the above-described embodiment, the stator 20 includes the three magnetic pole portions 20A to 20C and the two coils 50A and 50B. However, without being limited thereto, the stator 20 may include two the magnetic pole portions and one coil, or may include four or more magnetic pole portions.

In addition, according to the above-described embodiment, the stator 20 is magnetized into two poles. However, without being limited thereto, the stator 20 may be magnetized into four or more poles.

In addition, the indicating hand includes a configuration of taking a role as the indicating hand such as a needle-shaped indicating hand, a rod-shaped indicating hand, and a disc-shaped indicating hand.

In addition, according to the above-described embodiment, the stator main body 21, the first magnetic core 40A, and the second magnetic core 40B may be an integrally molded product, or may be formed in a single plate shape.

In addition, for example, according to the above-described embodiment, the first coil 50A and the first magnetic core 40A, and the second coil 50B and the second magnetic core 40B are formed so as to be substantially parallel to the linear portion 22a of the T-shaped first yoke 22. However, a structure which achieves an advantageous effect of the present invention is not limited thereto. For example, the first coil 50A and the first magnetic core 40A can be formed in a direction substantially parallel to the second yoke 23, and the second coil 50B and the second magnetic core 40B can be formed in a direction substantially parallel to the second yoke 24. In other words, without being limited to the vertical arrangement as in the above-described embodiment, the direction of the coil and the magnetic core according to the present invention can employ a lateral arrangement.

In addition to these configurations, within the scope not departing from the gist of the present invention, the configuration elements according to the above-described embodiment can be appropriately replaced with well-known configuration elements.

What is claimed is:
1. An analog timepiece which includes at least one indicating hand rotated by a unit step operation of a stepping motor, comprising:
   a rotor configured to rotate the at least one indicating hand, the rotor being configured to have opposite magnetic polarities;
   a stator configured to rotatably support the rotor and include more than one magnetic pole portion disposed around the rotor, wherein the more than one magnetic pole portion is arranged to provide the rotor with at least one stop position where potential energy is low;
   a coil configured to excite the more than one magnetic pole portion; and
   a control unit configured to control each unit step of the rotor by applying a series of consecutive electrical pulses to the coil, wherein the series of consecutive electrical pulses begins with a braking pulse applied to magnetize the more than one magnetic pole portion to hold the rotor at the at least one stop position, the braking pulse being immediately followed in the series of consecutive electrical pulses by at least one rotary pulse applied to magnetize the more than one magnetic pole portion to rotate the rotor to a next stop position.
2. The analog timepiece according to claim 1, wherein the control unit is further configured to detect sufficiency of rotation of the rotor, wherein the control unit is configured to detect an inductive voltage induced in the coil by free vibrations of the rotor that take place when the rotor becomes stationary after application of the series of consecutive electrical pulses to the coil is lifted.
3. The analog timepiece according to claim 1, wherein the more than one magnetic pole portion includes a first magnetic pole portion, a second magnetic pole portion, and a third magnetic pole portion arranged to surround the rotor, and
   wherein the coil includes a first coil that is magnetically coupled to the first magnetic pole portion and the third magnetic pole portion, and a second coil that is magnetically coupled to the second magnetic pole portion and the third magnetic pole portion.
4. The analog timepiece according to claim 3,
   wherein the first magnetic pole portion and the second magnetic pole portion are positioned to face one of the opposite magnetic poles of the rotor, and the third magnetic pole portion is positioned to face the other of the opposite magnetic poles of the rotor when the rotor is placed at the at least one stop position, and
   wherein the braking pulse magnetizes the first magnetic pole portion and the second magnetic pole portion to a magnetic pole opposite to said one of the opposite magnetic poles of the rotor, and magnetizes the third magnetic pole portion to a magnetic pole opposite to the other of the opposite magnetic poles of the rotor, so that the braking pulse magnetizes the first, second and third magnetic pole portions to hold the rotor at the at least one stop position, and
   wherein the rotary pulse magnetizes one of the first magnetic pole portion and the second magnetic pole portion to the magnetic pole that repels said one of the opposite magnetic poles of the rotor to rotate the rotor.
5. The analog timepiece according to claim 2,
   wherein in response to a detection of insufficient rotation of the rotor, the control unit is configured to apply a series of consecutive correction drive pulses to the coil to rotate the rotor further to the next stop position, wherein the series of consecutive correction drive pulses begins with a correction-purpose braking pulse to hold the rotation of the rotor, the correction-purpose braking pulse being followed in the series of consecutive correction drive pulses by at least one the correction-purpose rotary pulse applied to the coil to further rotate the rotor to the next stop position.

6. The analog timepiece according to claim 1, wherein in a fast-forward mode, the control unit is programmed to a plurality of the series of consecutive electrical pulses to the coil to fast-forward the at least one indicting hand, wherein each of second and subsequent series of consecutive electrical pulses does not include the braking pulse and only include the at least one rotary pulse.

7. A method of controlling an analog timepiece that includes at least one indicating hand rotated by a unit step operation of a stepping motor, the analog timepiece including a rotor configured to rotate the at least one indicating hand, the rotor being configured to have opposite magnetic polarities, a stator configured to rotatably support the rotor and include more than one magnetic pole portion disposed around the rotor, wherein the more than one magnetic pole portion is arranged to provide the rotor with at least one stop position where potential energy is low, and a coil configured to excite the more than magnetic pole portion, the method comprising:

controlling each unit step of the rotor by applying a series of consecutive electrical pulses to the coil, the series of consecutive electrical pulses begins with a braking pulse applied to magnetize the more than one magnetic pole portion to hold the rotor at the at least one stop position, the braking pulse being immediately followed in the series of consecutive electrical pulses by at least one rotary pulse applied to magnetize the more than one magnetic pole portion to rotate the rotor to a next stop position.

* * * * *